US008212229B2

(12) United States Patent
Slinkard et al.

(10) Patent No.: US 8,212,229 B2
(45) Date of Patent: Jul. 3, 2012

(54) METHODS AND APPAREL FOR ATTENUATING ELECTROMAGNETIC FIELDS EMANATING FROM AN ANIMAL HANDLER

(76) Inventors: Michael D. Slinkard, John Day, OR (US); John M. Maupin, John Day, OR (US)

( * ) Notice: Subject to any disclaimer, the term of this patent is extended or adjusted under 35 U.S.C. 154(b) by 329 days.

(21) Appl. No.: 12/428,763

(22) Filed: Apr. 23, 2009

(65) Prior Publication Data
US 2011/0057127 A1  Mar. 10, 2011

(51) Int. Cl.
*G21F 3/02* (2006.01)
(52) U.S. Cl. ............... 250/516.1; 250/505.1; 250/515.1; 2/69; 428/195.1; 428/316.6; 428/317.9
(58) Field of Classification Search .................. None
See application file for complete search history.

(56) References Cited

U.S. PATENT DOCUMENTS

| | | | |
|---|---|---|---|
| 3,380,087 A | | 4/1968 | Petty et al. |
| 3,822,403 A | * | 7/1974 | Coleman et al. ............ 455/40 |
| 4,211,980 A | | 7/1980 | Stowell |
| 4,653,473 A | * | 3/1987 | Kempe ..................... 128/846 |
| 4,825,877 A | * | 5/1989 | Kempe ..................... 128/846 |
| 4,868,580 A | * | 9/1989 | Wade ....................... 343/912 |
| 4,926,910 A | * | 5/1990 | Wade ...................... 139/425 R |
| 5,097,885 A | | 3/1992 | Kitagawa |
| 5,103,504 A | | 4/1992 | Dordevic |
| 5,203,033 A | | 4/1993 | Sheppard et al. |
| D337,366 S | | 7/1993 | Baker |
| D350,399 S | | 9/1994 | Bodrie |
| 5,377,711 A | | 1/1995 | Mueller |
| 5,521,655 A | | 5/1996 | Rhoad |
| 5,573,857 A | | 11/1996 | Auger |
| 5,578,359 A | * | 11/1996 | Forbes et al. .............. 428/131 |
| 5,621,188 A | | 4/1997 | Lee et al. |
| 5,675,838 A | | 10/1997 | Hollinger |
| 5,676,812 A | | 10/1997 | Kadokura |
| 5,767,933 A | | 6/1998 | Hagan |
| 5,935,706 A | | 8/1999 | Hoover et al. |
| 5,968,854 A | | 10/1999 | Akopian et al. |
| 5,983,913 A | | 11/1999 | Fargason |
| 6,061,828 A | | 5/2000 | Josephs |
| 6,127,022 A | * | 10/2000 | Pretorius ................. 428/195.1 |

(Continued)

FOREIGN PATENT DOCUMENTS

DE         3217977         11/1983

(Continued)

OTHER PUBLICATIONS

U.S. Appl. No. 12/701,169, filed Feb. 5, 2010, Slinkard et al.

(Continued)

*Primary Examiner* — David A Vanore
*Assistant Examiner* — Andrew Smyth
(74) *Attorney, Agent, or Firm* — David S. Alavi

(57) ABSTRACT

Attenuating, while handling an animal, one's own emanated electromagnetic field by wearing apparel that includes an electromagnetically shielding fabric. The shielding fabric comprises a substantially continuous system of conductive fibers combined with non-conductive fabric. Or attenuating, while a handler is handling an animal, the electromagnetic field emanated by the handler, by (i) providing to the handler apparel that includes the electromagnetically shielding fabric, and (ii) instructing the handler to wear it while handling an animal, respectively. The attenuation of the emanated electromagnetic field decreases the likelihood of the animal reacting to the emanated electromagnetic field.

23 Claims, 11 Drawing Sheets

U.S. PATENT DOCUMENTS

| | | | |
|---|---|---|---|
| 6,134,718 A | 10/2000 | Sesselmann | |
| 6,146,351 A * | 11/2000 | Kempe | 602/75 |
| 6,265,466 B1 * | 7/2001 | Glatkowski et al. | 523/137 |
| 6,269,489 B1 | 8/2001 | Heath | |
| 6,299,812 B1 | 10/2001 | Newman | |
| 6,539,966 B2 | 4/2003 | Raines et al. | |
| 6,632,499 B1 | 10/2003 | Marks et al. | |
| 6,694,995 B1 * | 2/2004 | Ransom | 135/128 |
| 6,868,854 B2 * | 3/2005 | Kempe | 128/849 |
| 6,941,961 B1 | 9/2005 | Eastman | |
| 7,100,626 B2 | 9/2006 | Livacich | |
| 7,134,857 B2 | 11/2006 | Andrady | |
| 7,182,091 B2 | 2/2007 | Maddox | |
| 7,196,023 B2 | 3/2007 | Langley et al. | |
| 7,208,115 B2 | 4/2007 | Sheridan et al. | |
| 7,354,877 B2 * | 4/2008 | Rosenberger et al. | 442/194 |
| 7,565,909 B2 | 7/2009 | Reis et al. | |
| 2001/0000849 A1 * | 5/2001 | Siman-Tov et al. | 62/259.3 |
| 2002/0069449 A1 | 6/2002 | Blutstein et al. | |
| 2002/0069904 A1 | 6/2002 | Robinson | |
| 2003/0233694 A1 * | 12/2003 | Wescombe-Down | 2/2.15 |
| 2004/0053780 A1 * | 3/2004 | Jiang et al. | 502/182 |
| 2004/0068415 A1 | 4/2004 | Soloman | |
| 2004/0107474 A1 * | 6/2004 | Sesselmann | 2/69 |
| 2004/0207566 A1 * | 10/2004 | Essig et al. | 343/878 |
| 2004/0209051 A1 * | 10/2004 | Santos et al. | 428/195.1 |
| 2006/0033674 A1 * | 2/2006 | Essig et al. | 343/912 |
| 2006/0094315 A1 * | 5/2006 | Brodsky | 441/80 |
| 2006/0147698 A1 * | 7/2006 | Carroll et al. | 428/316.6 |
| 2006/0170221 A1 | 8/2006 | Wobben | |
| 2006/0264137 A1 | 11/2006 | Gunje et al. | |
| 2007/0226868 A1 | 10/2007 | Hunt | |
| 2009/0184269 A1 * | 7/2009 | Rees | 250/516.1 |

FOREIGN PATENT DOCUMENTS

| | | | |
|---|---|---|---|
| EP | 1096604 A1 * | 5/2001 | |
| JP | 10046443 A * | 2/1998 | |
| JP | 2002-054055 | 2/2002 | |
| KR | 10-1994-0010630 | 10/1994 | |
| KR | 10-2000-0007920 | 2/2000 | |
| KR | 10-2003-0061535 | 7/2003 | |
| KR | 10-0433389 | 5/2004 | |
| KR | 20-0416156 | 5/2006 | |
| WO | WO 90/09473 | 8/1990 | |
| WO | WO 9748964 A1 * | 12/1997 | |
| WO | WO 2010/124145 | 10/2010 | |

OTHER PUBLICATIONS

International Search Report and Written Opinion of the International Searching Authority in co-owned App No. PCT/US2010/032133.
Office Action dated Feb. 7, 2011 in co-owned U.S. Appl. No. 12/347,971.
U.S. Appl. No. 12/347,967, Slinkard et al., filed Dec. 31, 2008.
U.S. Appl. No. 12/347,971, Slinkard et al., filed Dec. 31, 2008.
U.S. Appl. No. 12/549,698, Slinkard et al., filed Aug. 28, 2009.
U.S. Appl. No. 12/710,169, filed Feb. 5, 2010, Slinkard et al.
Pyrek, Kelly M.; Antimocrobials: Healthcare's Silver Bullet Against HAIs?; www.infenctioncontroltoday.com; online article posted Aug. 28, 2008.
Office Action dated Sep. 3, 2010 in co-owned U.S. Appl. No. 12/347,971.
Reply dated Nov. 23, 2010 in co-owned U.S. Appl. No. 12/347,971.
Office action dated Apr. 13, 2011 in co-owned U.S. Appl. No. 12/347,967.
Notice of Allowance dated Jun. 15, 2011 in co-owned U.S. Appl. No. 12/347,971.
Office action dated Apr. 18, 2011 in co-owned U.S. Appl. No. 12/549,698.
Office action dated Apr. 13, 2011 in co-owned U.S. Appl No. 12/701,169.
Office Action dated Oct. 14, 2011 in co-owned U.S. Appl. No. 12/347,971.
Office Action dated Jan. 5, 2012 in co-owned U.S. Appl. No. 12/347,967.
Office Action dated Jan. 6, 2012 in co-owned U.S. Appl. No. 12/549,698.
Loscher et al; Conspicuous behavioral abnormalities in a dairy cow herd near a TV and Radio transmitting antenna; Practical Veterinary Surgeon vol. 79 No. 5 p. 437 (1998).
Trzeciak et al; Behavioral effects of long-term exposure to magnetic fields in rats; Bioelectromagnetics vol. 14 No. 4 p. 297 (1993).

* cited by examiner

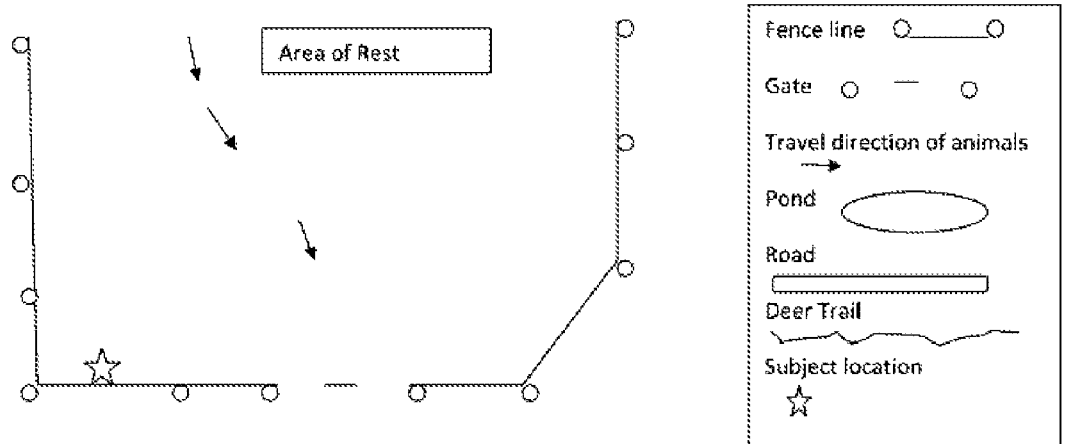
FIG. 5A
FIG. 5D
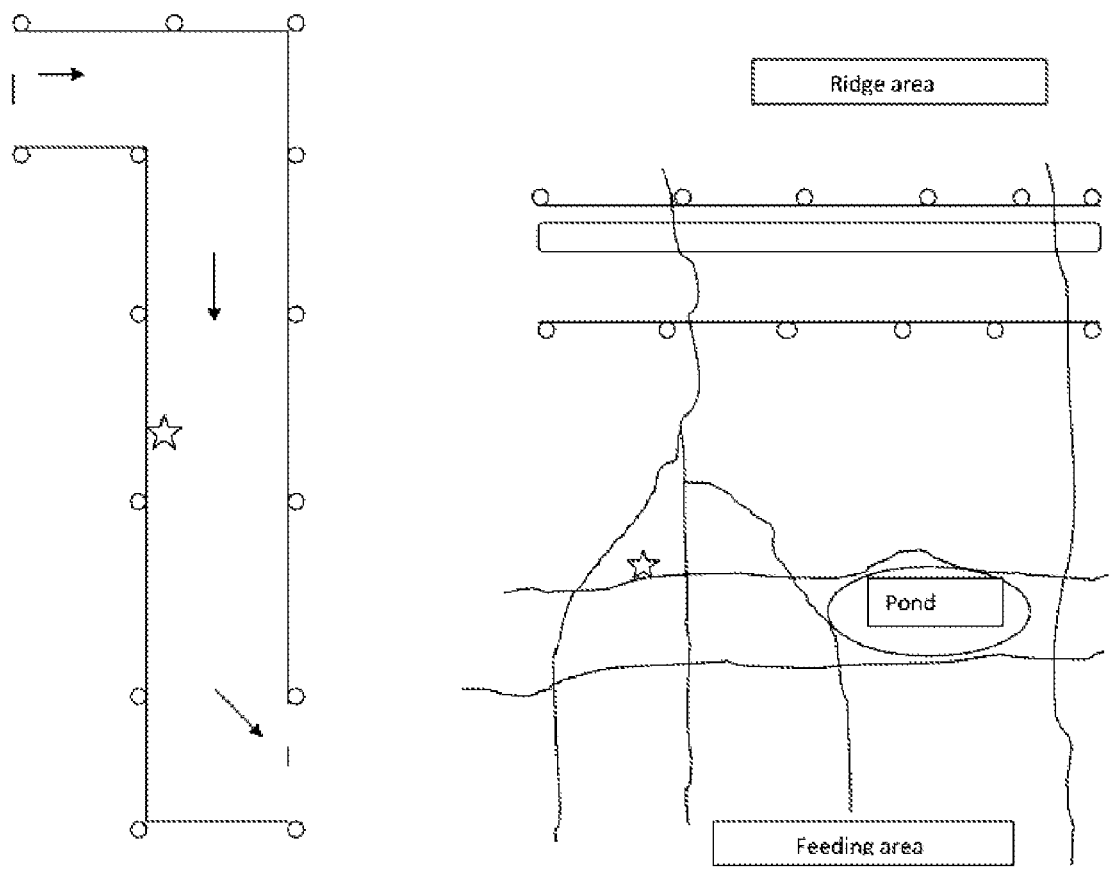
FIG. 5B
FIG. 5C

METHODS AND APPAREL FOR ATTENUATING ELECTROMAGNETIC FIELDS EMANATING FROM AN ANIMAL HANDLER

BACKGROUND

The field of the present invention relates to apparel worn by animal handlers. In particular, methods and apparel are disclosed for attenuating electromagnetic fields emanating from an animal handler.

The subject matter disclosed or claimed herein may be related to subject matter disclosed or claimed in: (i) U.S. non-provisional application Ser. No. 12/347,967 filed Dec. 31, 2008 in the names of Michael D. Slinkard and John M. Maupin and entitled "Methods and apparel for attenuating electromagnetic fields emanating from a hunter," and (ii) U.S. non-provisional application Ser. No. 12/347,971 filed Dec. 31, 2008 in the names of Michael D. Slinkard and John M. Maupin and entitled "Methods and hunting blind for attenuating electromagnetic fields emanating from a hunter." Both of said applications are incorporated by reference as if fully set forth herein.

Successful hunting requires that the hunter approach a prey animal closely enough to make a kill, by gunshot, bowshot, or other means. Hunting apparel typically includes adaptations for enabling the hunter to approach the prey animal without detection by the animal (or at least making such detection less likely).

Alternatively, a hunter can remain stationary and wait for a prey animal to approach his/her position. A hunter typically employs a hunting blind for concealment while awaiting the approach of the prey animal. A hunting blind typically includes adaptations for enabling the hunter to remain undetected by the approaching prey animal (or at least making such detection less likely).

The apparel or blinds used for hunting can also be used by those who wish to observe animals in the wild. Such observation can include photographing, filming, recording, or merely viewing or listening to the animal. By remaining undetected by an animal (or at least by making such detection less likely), one can observe the animal from a closer range and improve the quality of the observation. In the remainder of the present disclosure, most occurrences of the term "hunter" can be equivalently construed as "observer of wildlife" or just "observer," unless the particular context makes it clear that that equivalence would not apply.

Camouflage clothing, hoods or other headwear, glasses or other eyewear, or hunting blinds are conventionally used to conceal a hunter or wildlife observer. Such visual camouflage causes the hunter to blend in with the surroundings, making him or her less visible to a prey animal. In addition to visual camouflage, hunting apparel or a hunting blind can also include an odor absorber, suppressant, attenuator, or blocker. Examples of various hunting apparel and hunting blinds can be found in the following references, each of which is incorporated by reference as if fully set forth herein:

Pat. Pub No. 2007/0226868 entitled "Low-cost disposable odor-reducing hunting clothing" published Oct. 4, 2007 in the name of Hunt;

U.S. Pat. No. 7,182,091 entitled "Hunting blind and method of use thereof" issued Feb. 27, 2007 to Maddox;

Pat. Pub No. 2006/0147698 entitled "Garments preventing transmission of human body odor" published Jul. 6, 2006 in the names of Carroll et al; and Pat. Pub. No. 2004/0209051 entitled "Camouflage U.S. Marine Corps utility uniform: pattern, fabric, and design" published Oct. 21, 2004 in the names of Santos et al;

Pat. Pub No. 2004/0107474 entitled "Odor absorbing article of clothing" published Jun. 10, 2004 in the name of Sesselmann.

U.S. Pat. No 6,694,995 entitled "Rapidly-opening hunting blind" issued Feb. 24, 2004 to Ransom;

U.S. Pat. No. 6,632,499 entitled "Hunter camouflage system" issued Oct. 14, 2003 to Marks et al;

U.S. Pat. No. 6,539,966 entitled "Removable cover for a hunting blind" issued Apr. 1, 2003 to Raines et al;

Pat. Pub No. 2002/0069449 entitled "Hood including three-dimensional covering" published Jun. 13, 2002 in the names of Blutstein et al;

U.S. Pat. No. 6,061,828 entitled "Camouflage items and camouflage material thereon" issued May 16, 2000 to Josephs;

U.S. Pat. No. 5,767,933 entitled "Camouflage eyewear" issued Jun. 16, 1998 to Hagan;

U.S. Pat. No. 5,675,838 entitled "Camouflage clothing" issued Oct. 14, 1997 to Hollinger;

U.S. Pat. No. 5,521,655 entitled "Camouflage eyewear" issued May 28, 1996 to Rhoad;

Pat. No. Des. 350,399 entitled "Hunting blind" issued Sep. 6, 1994 to Bodrie;

Pat. No. Des. 337,366 entitled "Hunting blind" issued Jul. 13, 1993 to Baker; and U.S. Pat. No. 5,203,033 entitled "Camouflaged garment" issued Apr. 20, 1993 to Sheppard et al.

Both visual camouflage and odor reduction serve to reduce the ability of the prey animal to perceive the presence of the hunter or observer in the animal's environment, by sight and scent, respectively.

It is known that the human body generates electromagnetic fields during normal body functions, and that those fields can increase in strength with increased activity, excitement, emotion, or attention. For example, brain activity, nerve activity, and muscle activity all result in electric fields that emanate from the body. Detection and characterization of such fields is the basis for the conventional clinical techniques of electrocardiography (i.e., ECG or EKG), electroencephalography (i.e., EEG), and electromyelography (i.e., EMG). For the purposes of the present disclosure or claims, "electromagnetic" is intended to denote those fields that have temporal variations well below so-called optical frequencies (i.e., having frequency components no greater than about 1 gigahertz (GHz), typically no greater than about 1 megahertz (MHz), and often no greater than about 1 kilohertz (kHz).

It is also known that at least some animals can detect or respond to electromagnetic fields. For example, sharks detect electric fields emanating from prey by means of special sensing organs called the ampullae of Lorenzini (http://en.wikipedia.org/wiki/Ampullae_of_Lorenzini). A shark-repelling system is disclosed in U.S. Pat. No. 4,211,980 that generates an electric field to drive away the sharks. Other animals are believed to navigate their natural migratory routes using the earth's magnetic field (http://www.pbs.org/wgbh/nova/magnetic/animals.html).

Fabrics exist that are adapted to attenuate or block electromagnetic fields. They typically include electrically conductive fibers (metal, carbon nanotubes, or other conductive fibers) incorporated into the fabric along with more typical textile fibers. Garments constructed from such fabrics are conventionally used to shield a human wearer from surrounding electromagnetic fields. Such shielding can be usefully employed into safety equipment or apparel, can be worn by or applied to a patient to provide various health or therapeutic benefits, or for other purposes. Examples of such fabrics and their uses can be found in the following references, each of which is incorporated by reference as if fully set forth herein:

U.S. Pat. No. 7,354,877 entitled "Carbon nanotube fabrics" issued Apr. 8, 2008 to Rosenberger et al;

U.S. Pat. No. 6,868,854 entitled "Method and article for treatment of fibromyalgia" issued Mar. 22, 2005 to Kempe;

Pat. Pub. No. 2004/0053780 entitled "Method for fabricating nanotube yarn" published Mar. 18, 2004 in the names of Jiang et al;

U.S. Pat. No. 6,265,466 entitled "Electromagnetic shielding composite comprising nanotubes" issued Jul. 24, 2001 to Glatkowski et al;

U.S. Pat. No. 6,146,351 entitled "Method of reducing delayed onset muscle soreness" issued Nov. 14, 2000 to Kempe;

U.S. Pat. No. 5,621,188 entitled "Air permeable electromagnetic shielding medium" issued Apr. 15, 1997 to Lee et al;

U.S. Pat. No. 4,825,877 entitled "Method of pain reduction using radiation-shielding textiles" issued May 2, 1989 to Kempe; and U.S. Pat. No. 4,653,473 entitled "Method and article for pain reduction using radiation-shielding textile" issued Mar. 31, 1987 to Kempe.

There is no teaching or suggestion in the prior art to attenuate or block electromagnetic fields emanating from a human body, or that such attenuation or blocking would be desirable.

SUMMARY

A method comprises attenuating, while handling an animal, one's own emanated electromagnetic field by wearing at least one article of apparel that includes an electromagnetically shielding fabric. The shielding fabric comprises a substantially continuous system of conductive fibers combined with a non-conductive fabric. The attenuation of one's own emanated electromagnetic field decreases the likelihood of the animal reacting to the emanated electromagnetic field.

Another method comprises attenuating, while a handler of an animal handles the animal, the electromagnetic field emanated by the handler. The attenuation is accomplished by (i) providing to the handler at least one article of apparel that includes the electromagnetically shielding fabric, and (ii) instructing the handler to wear, while handling the animal, at least one said article of apparel. The attenuation of the electromagnetic field emanated by the handler decreases the likelihood of the animal reacting to the emanated electromagnetic field.

Objects and advantages pertaining to apparel incorporating electromagnetic shielding fabric may become apparent upon referring to the exemplary embodiments illustrated in the drawings and disclosed in the following written description or appended claims.

BRIEF DESCRIPTION OF THE DRAWINGS

FIGS. 5A-5C illustrate experimental arrangements described in the Appendix. FIG. 5D is a legend defining the symbols used in FIGS. 5A-5C.

The embodiments shown in the Figures are exemplary, and should not be construed as limiting the scope of the present disclosure or appended claims.

DETAILED DESCRIPTION OF EMBODIMENTS

A method comprises attenuating, while hunting, the electromagnetic field emanated by a hunter. The electromagnetic field is attenuated by at least one article of apparel worn by the hunter while hunting. The article comprises an electromagnetically shielding fabric, which fabric comprises a substantially continuous system of conductive fibers combined with a non-conductive fabric. Another method can include providing at least one such article of electromagnetically shielding apparel to a hunter and instructing that hunter to wear the article while hunting. That method can also include constructing at least one said article of apparel prior to providing it to the hunter. There is no teaching or suggestion in the prior art to attenuate or block electromagnetic fields emanating from a hunter while hunting (or from an observer while observing wildlife), or that such attenuation or blocking would be desirable. There is no teaching or suggestion in the prior art to incorporate electromagnetically shielding fabric into hunting apparel, or that the incorporation of such fabrics would be desirable.

By attenuating or blocking electromagnetic fields emanating from a hunter or observer, that hunter or observer can more closely approach an animal without detection, or detection of that hunter or observer by the animal can be made less likely. It is therefore desirable to provide hunting apparel (including, e.g., clothing, eyewear, headwear) or a hunting blind that attenuates or blocks electromagnetic fields emanating from the hunter or observer, thereby decreasing the likelihood of detection of the hunter or observer by an animal that is sensitive to electromagnetic fields, and increasing the likelihood that the hunter will be successful in taking the animal, or that the observer will be successful in making the desired observation of the animal.

Figure 1A:
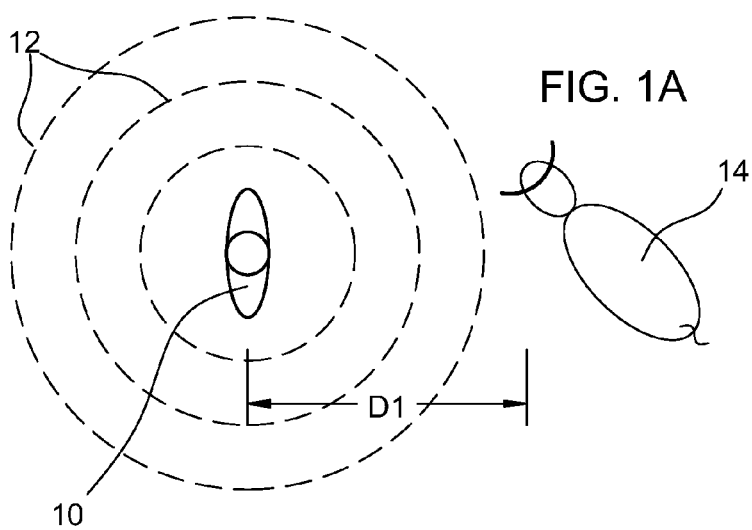
FIGS. 1A and 1B are schematic top views illustrating the approach of a hunter toward a prey animal (or vice versa) with and without, respectively, electromagnetically shielding apparel or hunting blind.
Figure 1B:
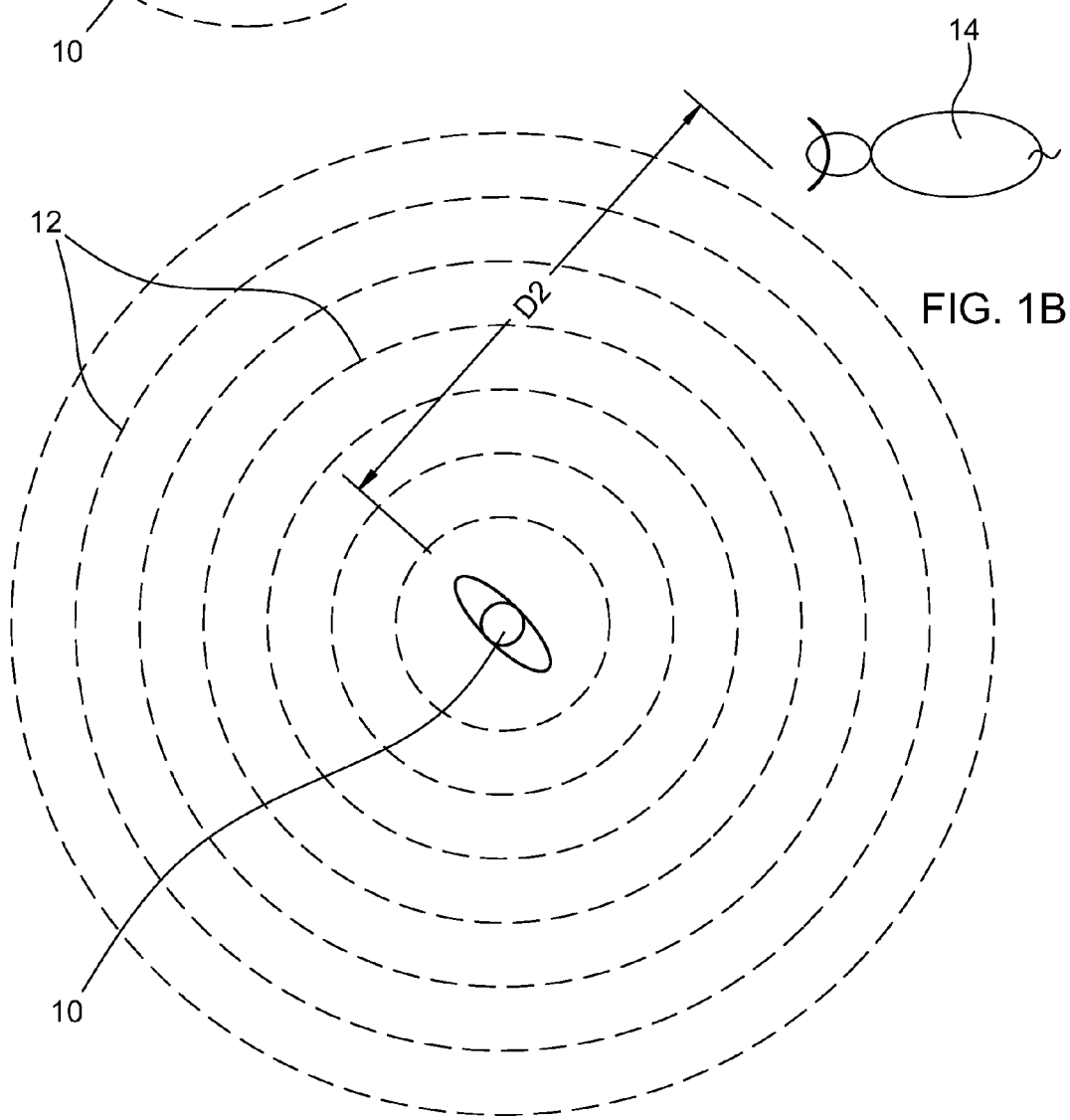

The hunter wears the article of apparel while hunting. The electromagnetically shielding fabric blocks or attenuates an electromagnetic field emanating from the hunter's body, thereby decreasing the likelihood that he or she will be detected by a prey animal sensitive to such electromagnetic fields. An electromagnetic field 12 emanated by a hunter 10 and thus attenuated can be detected by an animal 14 at a maximum distance D1 (FIG. 1A) that is smaller than the maximum detection distance D2 at which an unattenuated field 12 (FIG. 1B) can be detected by that same animal 14. The hunter 10 can therefore approach the animal 14 more closely without detection, facilitating the kill. In measurements of electromagnetic fields emanating from a human body, reductions of field strength ranging from about 38% to about 65% have been observed, as shown illustrated in the experimental results disclosed in an Appendix attached to this specification. Any suitable, desirable, or practicable reduction of emanated electromagnetic field strength shall fall within the scope of the present disclosure or appended claims.

The electromagnetically shielding fabric may block or attenuate electric fields, magnetic fields, or both, and any of those alternative shall fall within the scope of the present disclosure or appended claims. It may be preferable under particular circumstances to preferentially block either electric fields or magnetic fields, and such uses are encompassed by the present disclosure or appended claims.

Figure 2:
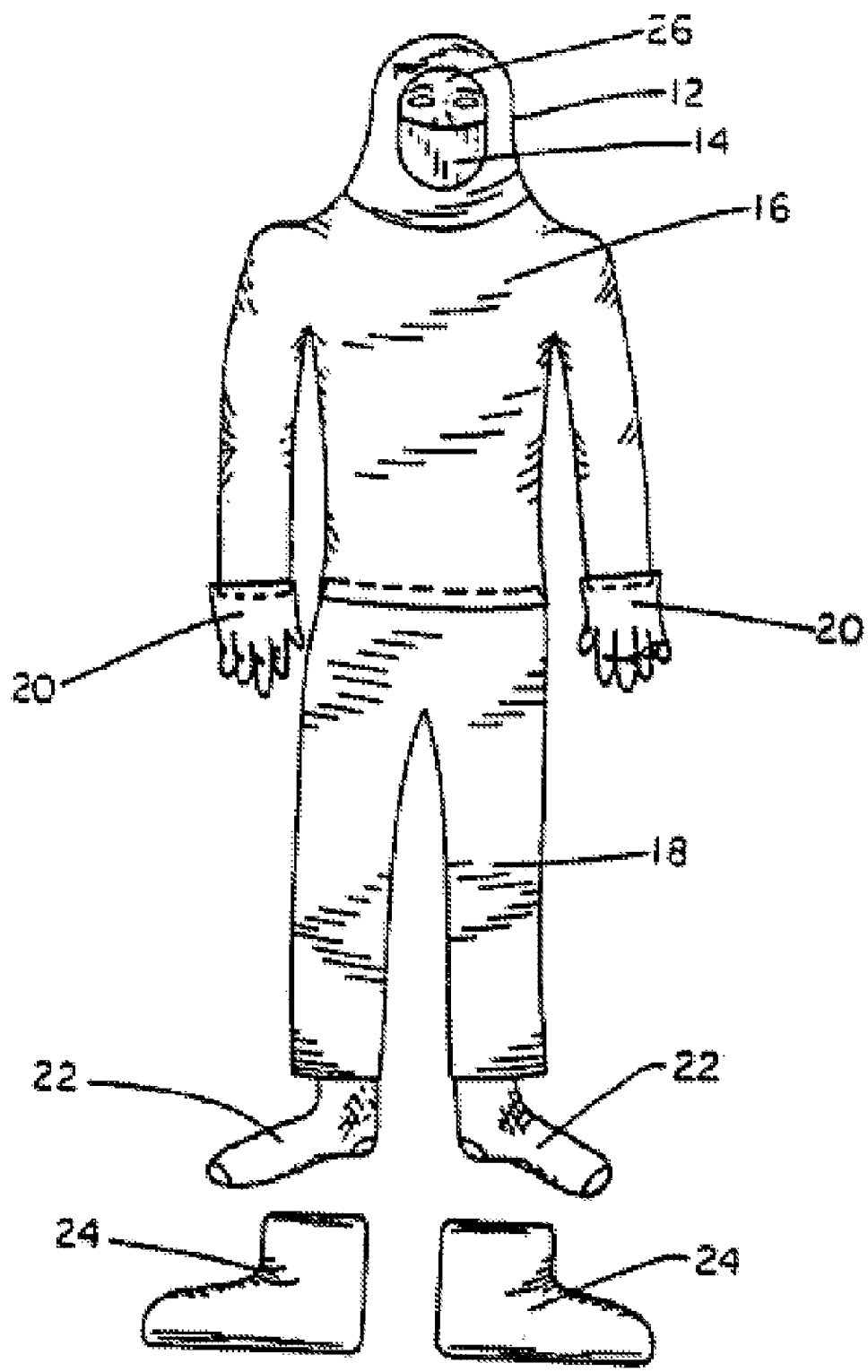
FIG. 2 illustrates various exemplary articles of electromagnetically shielding apparel.

As illustrated by the examples of FIG. 2, an article of hunting apparel incorporating electromagnetically shielding fabric can comprise an article of clothing (e.g., pants 18, shorts, shirt 16, undergarments, leggings, sleeves, gloves 20, mittens, jacket, coat, vest, overalls, waders, or snowsuit), footwear (e.g., shoes, boots 24, socks 22, or boot liners), headwear (e.g., hood 12, facemask 14, or hat), or eyewear (e.g., glasses or goggles 26).

A method comprises attenuating, while handling an animal, the electromagnetic field emanated by a handler of the animal. The electromagnetic field is attenuated by at least one article of apparel worn by the handler while handling the animal. The article of apparel comprises an electromagnetically shielding fabric, which fabric comprises a substantially continuous system of conductive fibers combined with a non-conductive fabric. Another method can include providing at least one such article of electromagnetically shielding apparel to a handler and instructing that handler to wear the article while handling the animal. That method can also include constructing at least one said article of apparel prior to providing it to the handler. There is no teaching or suggestion in the prior art to attenuate or block electromagnetic fields emanating from an animal handler while handling an animal, or that such attenuation or blocking would be desirable. There is no teaching or suggestion in the prior art to incorporate electromagnetically shielding fabric into apparel for an animal handler, or that the incorporation of such fabrics would be desirable.

Attenuating or blocking electromagnetic fields emanating from a person can also be advantageous while handling an animal. It has been observed frequently that animals can be affected by emotional responses or the emotional state of a person nearby, e.g., a person's anxiety can cause nervous or uneasy behavior of the animal, or a person's fear can trigger an aggressive response from the animal. Sensing by an animal of a person's emotional state or response might occur in a variety of ways, e.g., by detecting by smell pheromones released as a result of the person's emotional state or response, or by sensing emotion-related electromagnetic fields resulting from the person's emotional state or responses. Attenuating or blocking fields emanating from the person can advantageously reduce the effect on the animal of the emotional state or an emotional response of the person.

"Handling" an animal shall encompass, inter alia: (i) literal handling of the animal by holding or touching the animal; (ii) handling the animal using a rope, chain, leash, muzzle, harness, saddle, reins, yoke, prod, whip, or other equipment; (iii) feeding the animal; (iv) guiding, directing, herding, capturing, or restraining the animal; (v) riding the animal; (vi) using the animal to pull or push a vehicle, object, or equipment of any sort; (vii) using the animal in a performance, display, or demonstration; (viii) training the animal for any purpose, including but not limited to those listed here; (ix) conducting veterinary examination or treatment of the animal; (x) using an animal to train another handler to perform any animal-handling task, including but not limited to those listed here; (xi) using an animal to learn from another handler to perform any animal-handling task, including but not limited to those listed here; and (xii) other activities that involve interaction between a person and an animal.

An animal handler wears the article of electromagnetically shielding apparel while handling the animal. Instead or in addition, other people likely to be near the animal (i.e., bystanders) can wear articles of electromagnetically shielding apparel; for purposes of the present disclosure or appended claims, the terms "handler" and "handling" shall be construed as including both those persons interacting directly with the animal as well as bystanders that might interact with the animal indirectly (e.g., by being near enough to affect the animal via pheromones or emanated electromagnetic fields). By blocking or attenuating electromagnetic fields emanating from a person near the animal, the animal is less likely to sense such fields that arise from an emotional response or state of the person, and is therefore also less likely to react to that emotional state or reaction. In particular, emotional responses or states that might cause undesirable behavior of the animal (e.g., flight or aggression) are less likely to be sensed by the animal. Such emotional states or responses can arise for a variety of reasons, e.g., a handler's or bystander's fear of the animal, a handler's frustration with the animal's behavior or response (or lack thereof) to its training, a handler's frustration or discomfort while being taught how to handle an animal, or an instructor's frustration at a handler trainee's response (or lack thereof) to his/her instruction.

Electromagnetically shielding apparel can be advantageously employed during other activities or in other situations. In one example, such apparel can be worn while the wearer is in a body of water (river, lake, or sea). Blocking or attenuating electromagnetic fields can reduce the likelihood of detection of the wearer by aquatic or marine predators, such as sharks. Electromagnetically shielding apparel can be provided to or worn by swimmers or divers in a river, lake, or sea, or electromagnetically shielding apparel can be included with other water survival gear on a vessel or aircraft. Any other use of electromagnetically shielding clothing, in a situation wherein blocking or attenuation of the wearer's emanated electromagnetic field may be advantageous, shall fall within the scope of the present disclosure, whether that situation involves an animal or not.

Figure 3A:
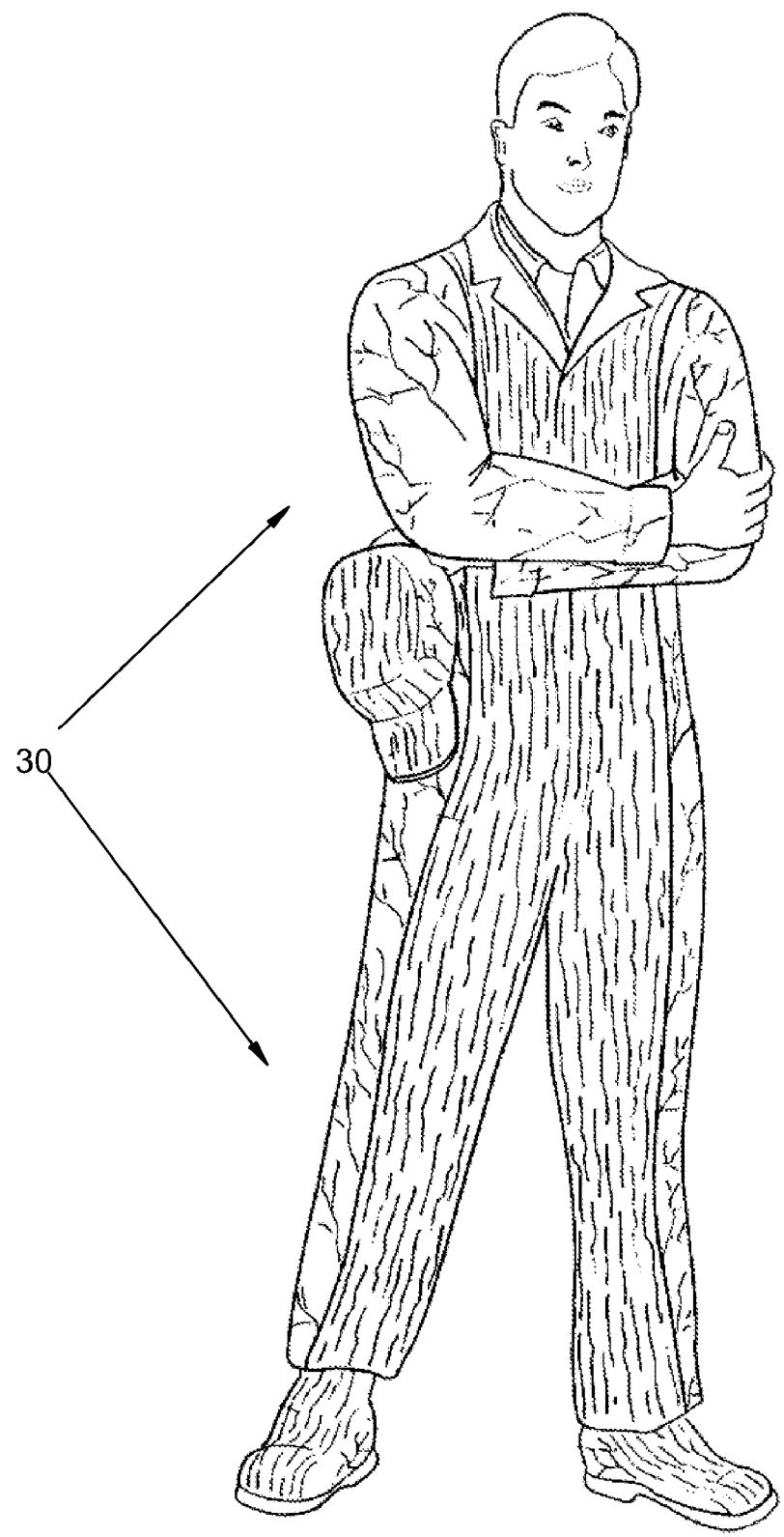
FIGS. 3A and 3B illustrate exemplary articles of electromagnetically shielding apparel that include exemplary visual camouflage patterns.
Figure 3B:
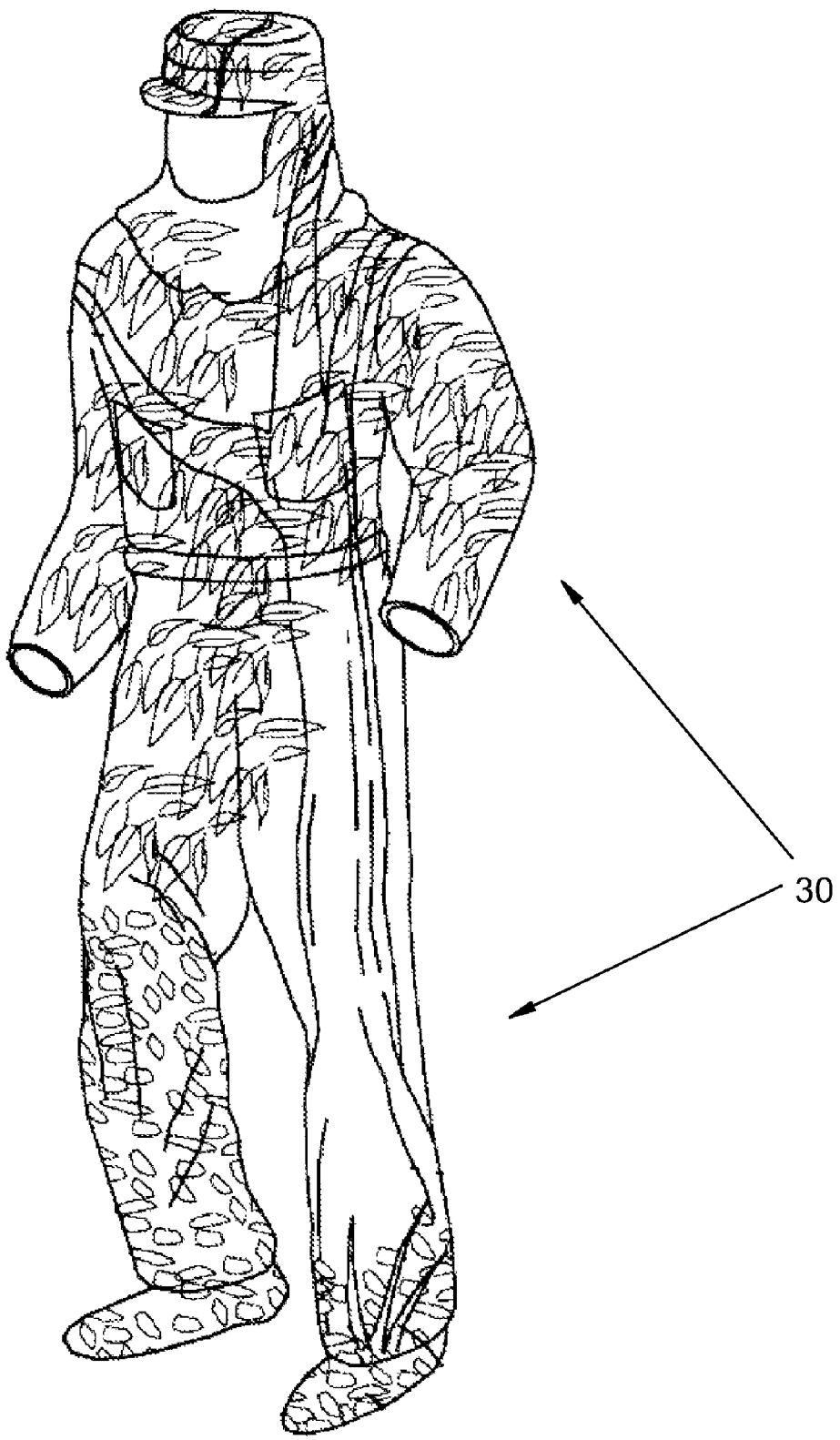

In addition to providing electromagnetic shielding, the article of apparel can also be adapted or arranged to decrease visual or olfactory perception of the hunter by a prey animal. For example, articles of apparel 30 can include a visual camouflage pattern on at least a portion of its outer surface (as in FIGS. 3A and 3B). Many examples of such visual camouflage are known, and some examples are disclosed in various of the incorporated references. Any suitable visual camouflage pattern, including both two- and three-dimensional patterns, shall fall within the scope of the present disclosure or claims. In another example, the article of apparel can include an odor absorber, suppressant, attenuator, or blocker. Some examples of these are disclosed in various of the incorporated references. Any suitable odor absorber, suppressant, attenuator, or blocker shall fall within the scope of the present disclosure or claims. By combining electromagnetic shielding with visual camouflage or odor control, the overall likelihood that the hunter will be detected by a prey animal can be decreased, and the probability of a successful kill can be increased. Use of odor control can also reduce the likelihood that an animal will sense (via pheromones) and react to an emotional response or the emotional state of a handler.

Figure 4A:
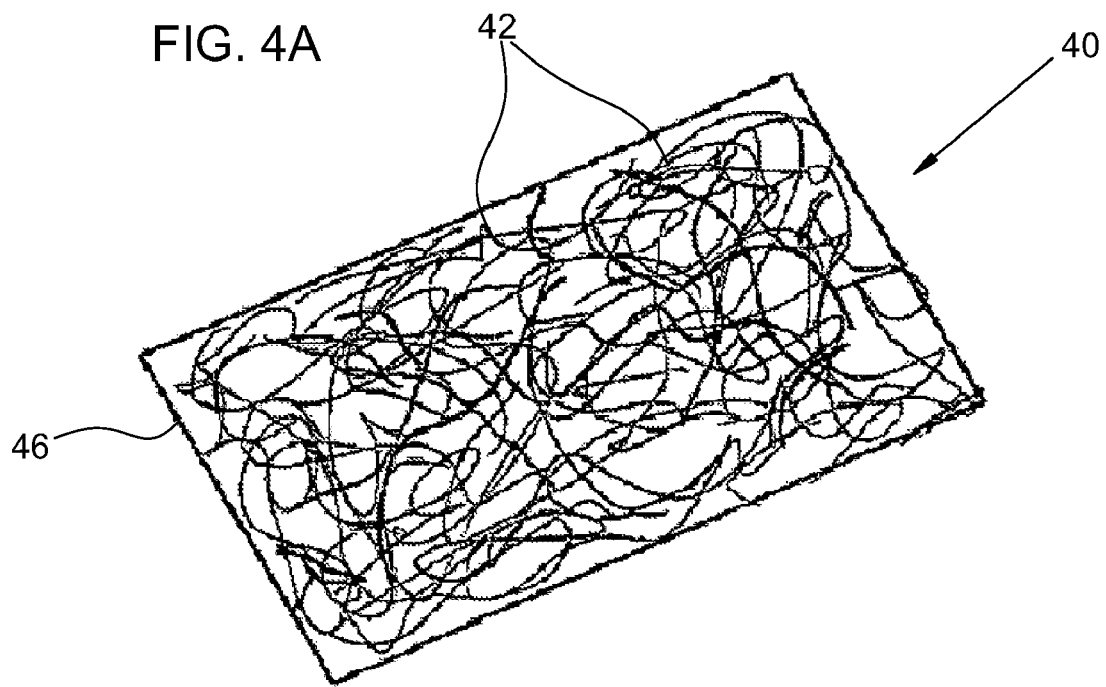
FIGS. 4A and 4B illustrate exemplary electromagnetically shielding fabrics.
Figure 4B:
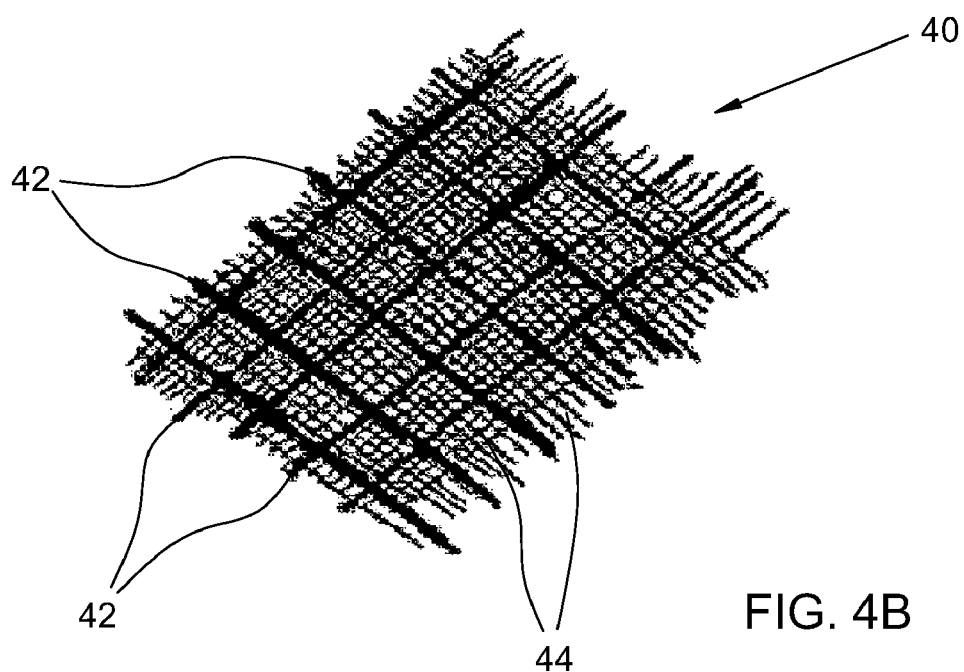
Figure 6A:
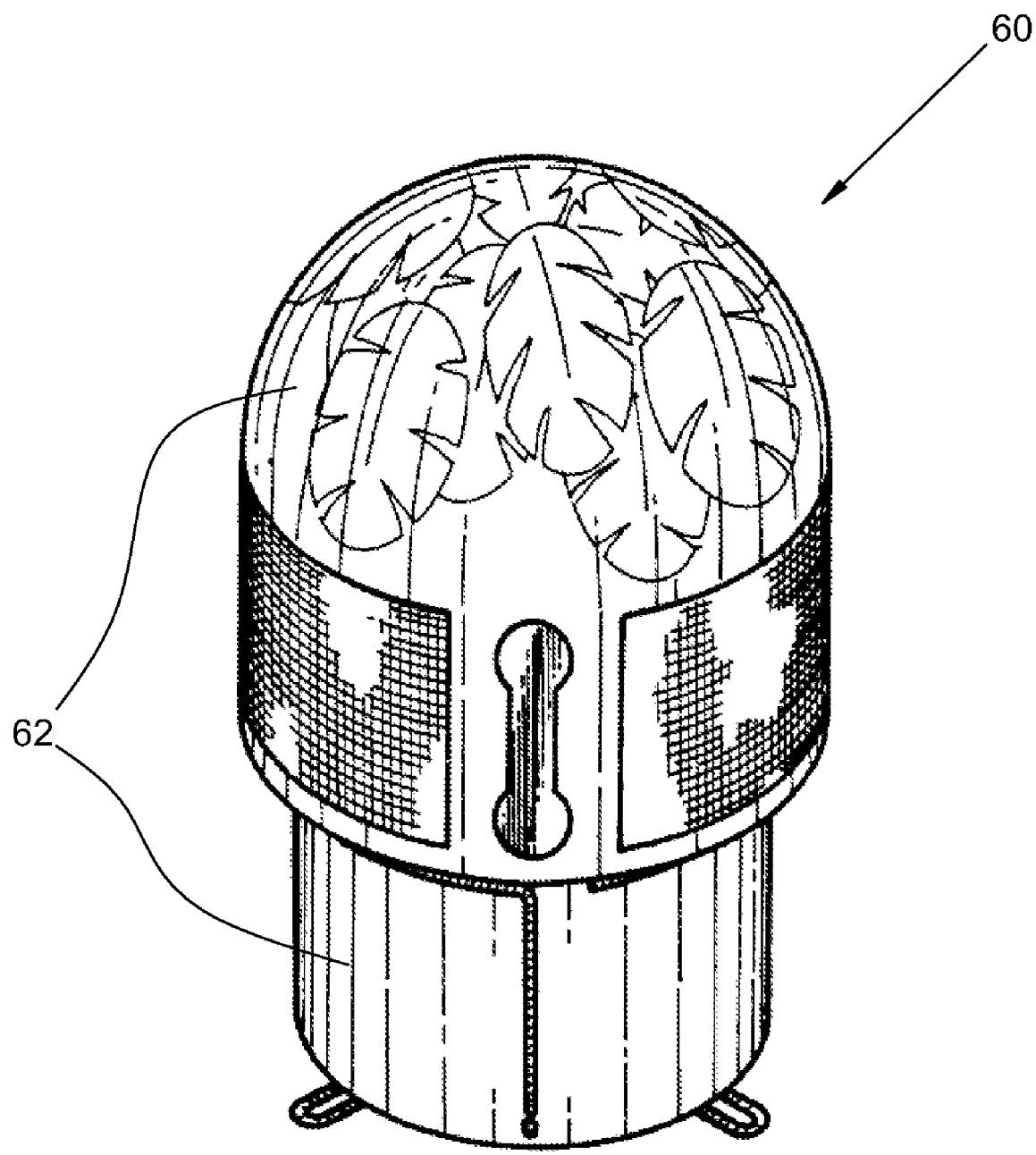
FIGS. 6A-6E illustrate exemplary hunting blinds that include electromagnetically shielding material.
Figure 6B:
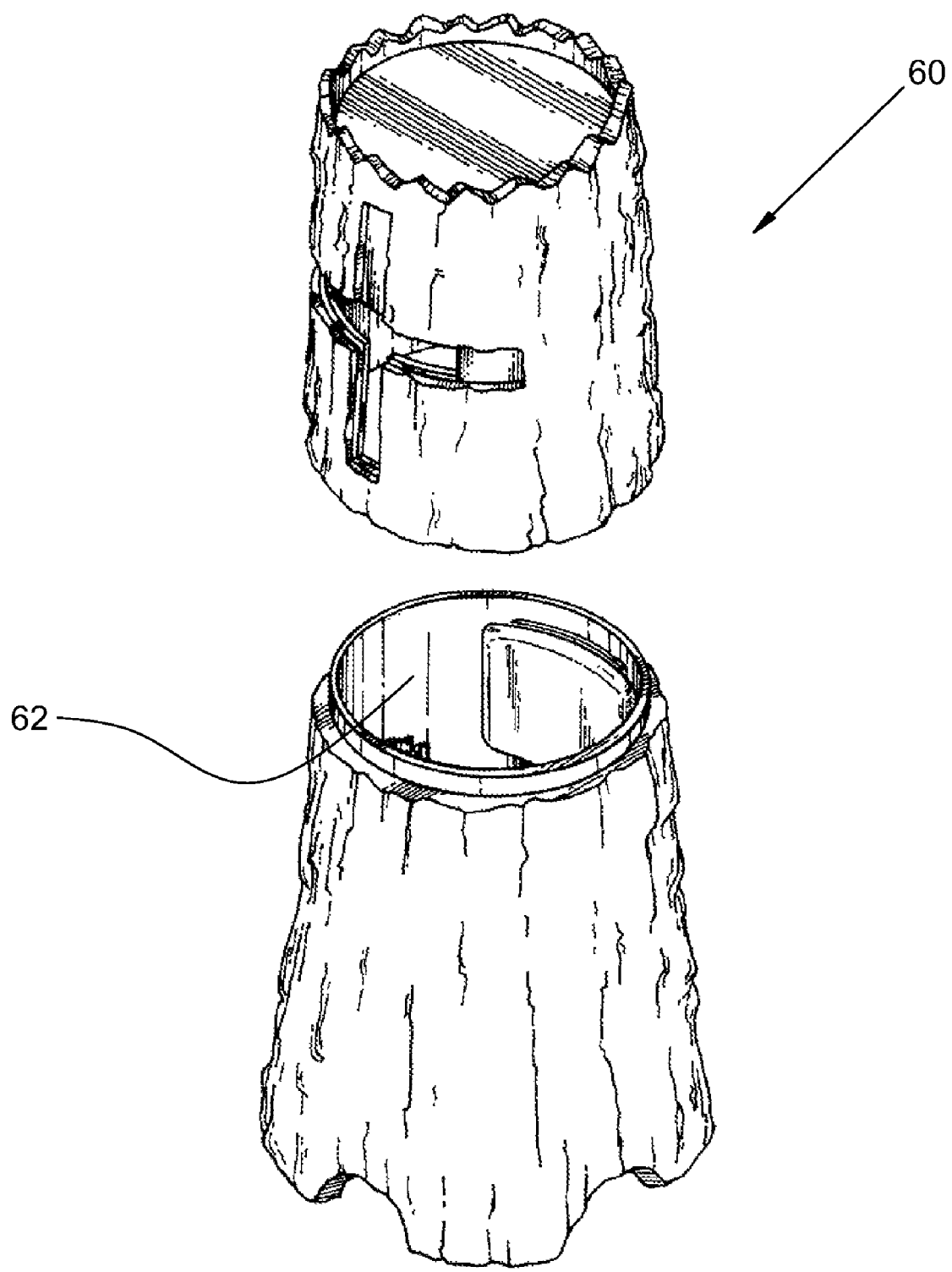
Figure 6C:
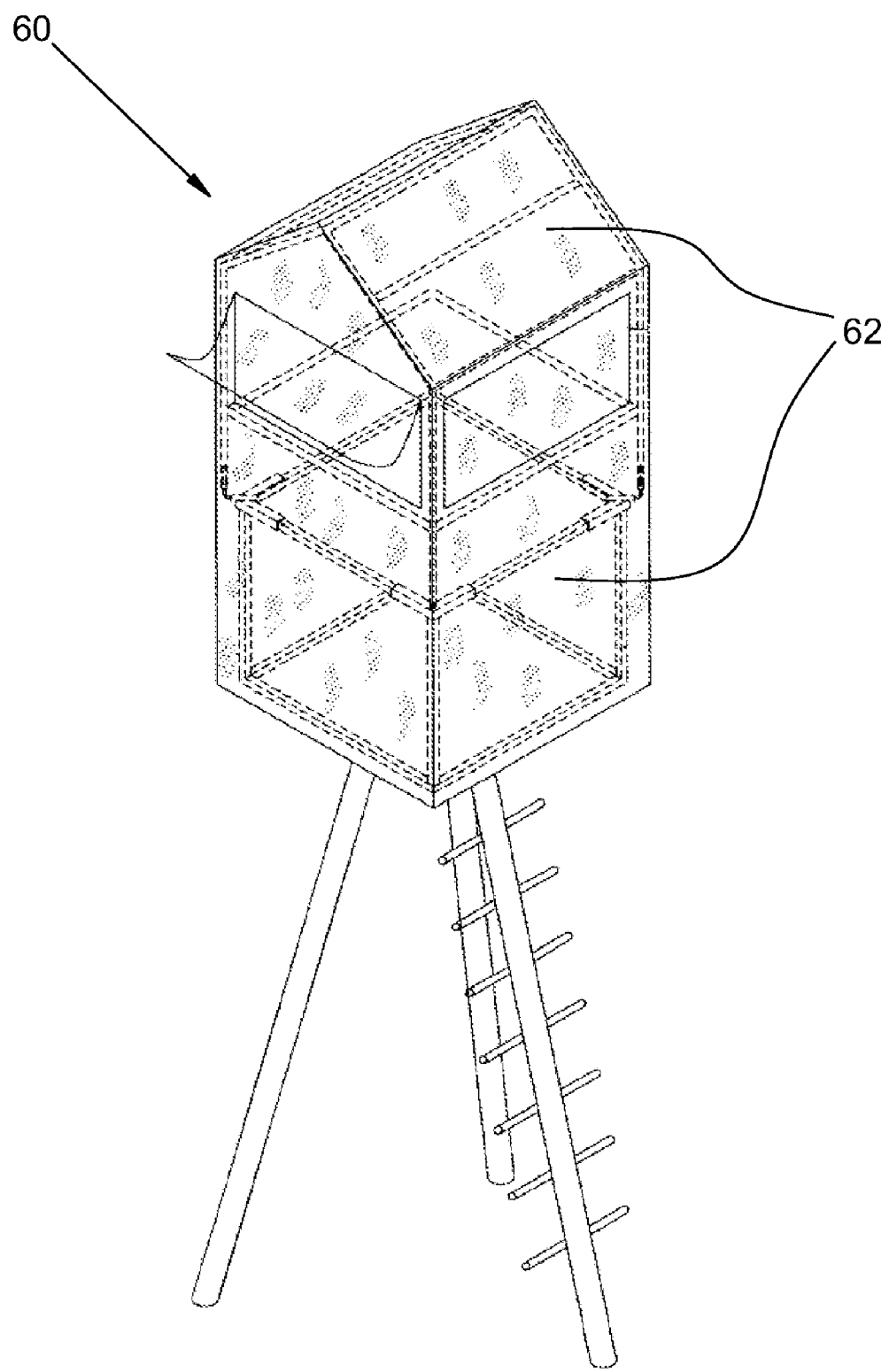
Figure 6D:
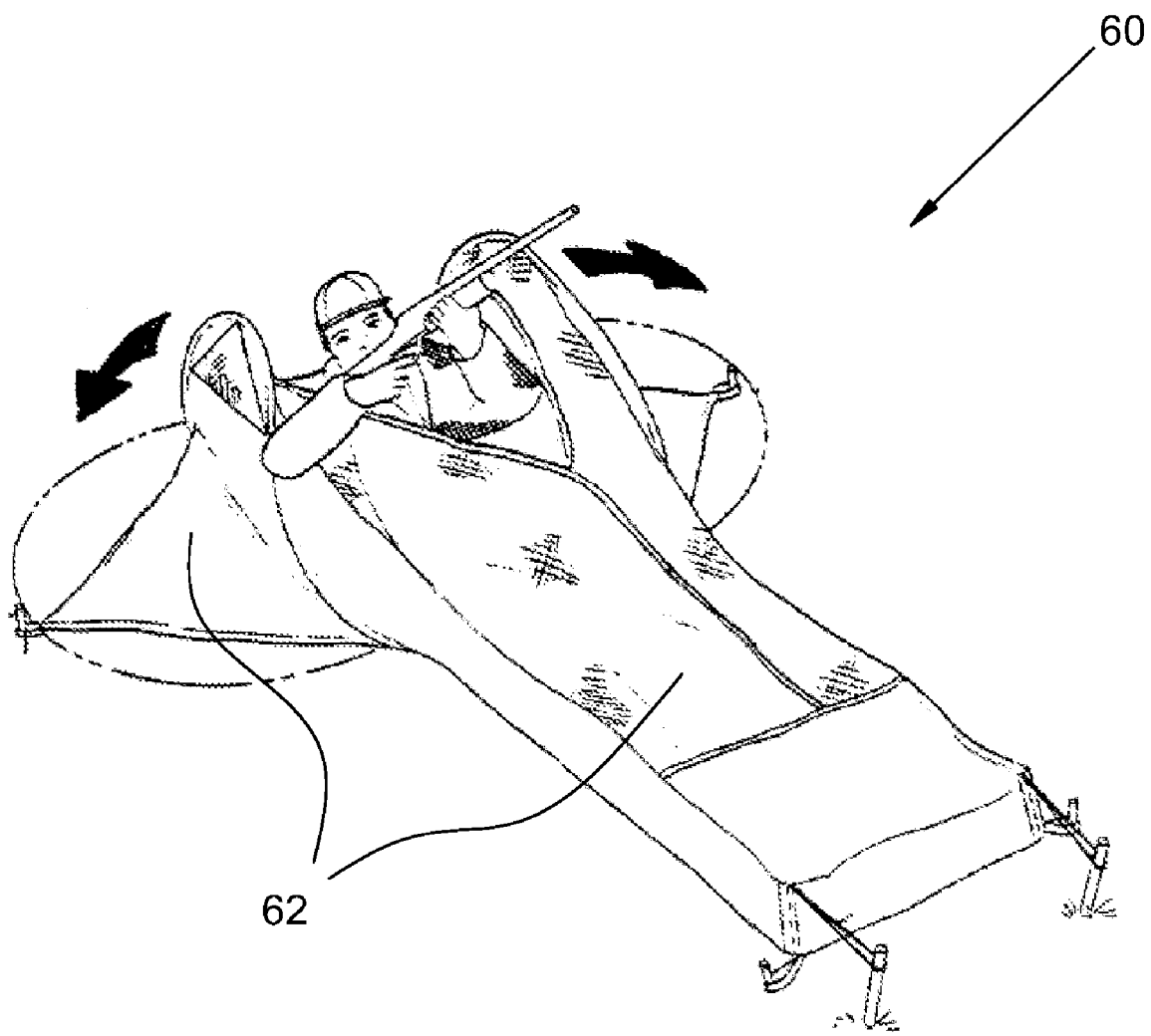
Figure 6E:
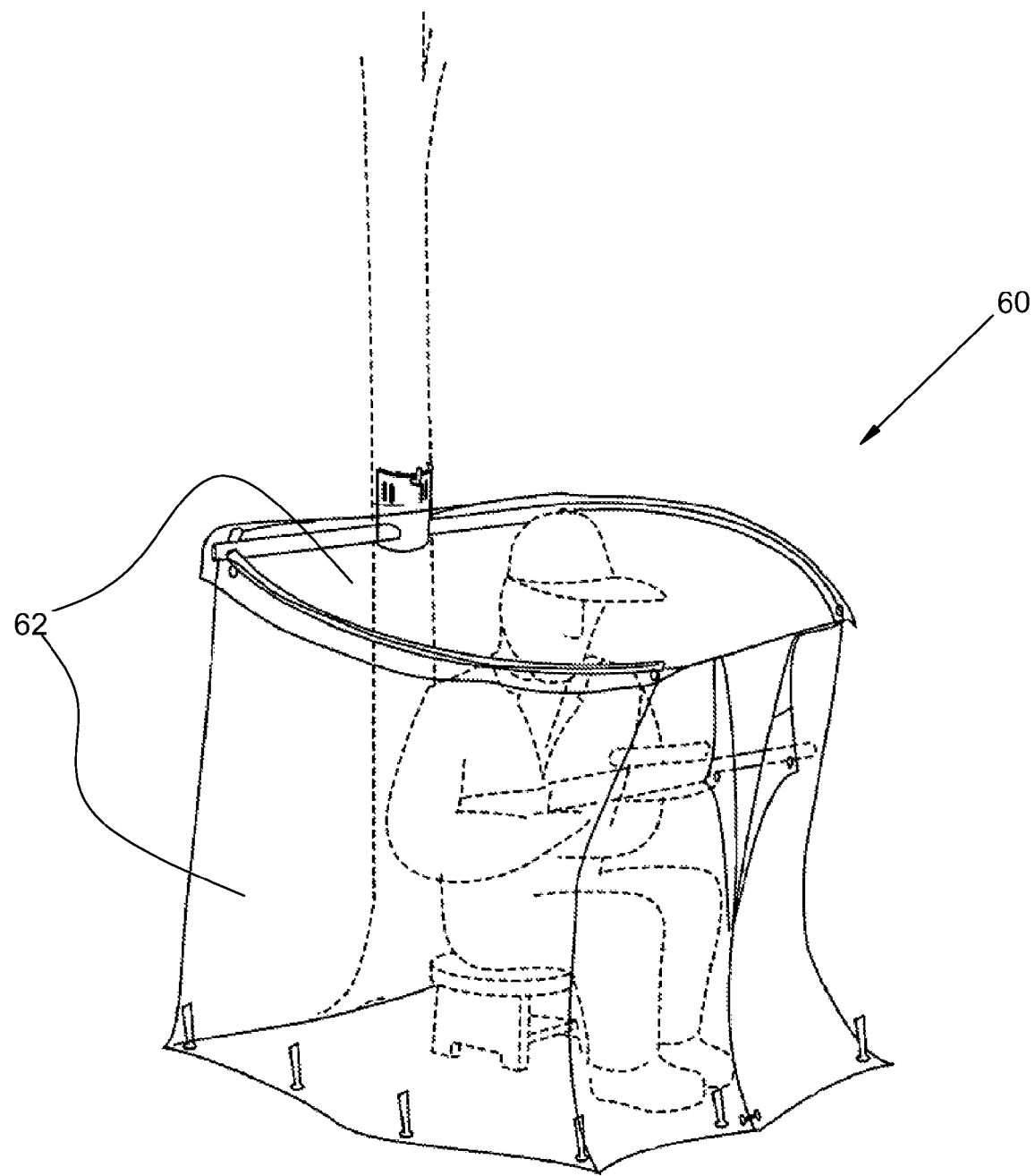

Any suitable fabric can be employed that incorporates conductive fibers of any suitable type to form a substantially continuous electrical conduction network in the fabric. The conduction network 42 can be arranged irregularly (as in the example of FIG. 4A), in a grid-like pattern (as in the example of FIG. 4B), or in any other suitable, desirable, or practicable arrangement. The conductive fibers can be intermingled with non-conductive fibers 44 to form the shielding fabric 40 (in a regular, interwoven arrangement or in an irregular arrangement). Examples of suitable fibers include typical textile fibers, e.g., wool, silk, or other natural polyamide fibers; cotton, rayon, or other cellulosic fibers; or nylon, polyester, Kevlar, or other synthetic fibers. Alternatively, the conductive fibers 42 (regularly or irregularly arranged) can be applied to a surface of a non-conducting fabric 46 to form the shielding fabric 40. In that latter case, the non-conducting fabric can comprise a woven, textile fabric, or can comprise a substantially continuous sheet fabric such as a plastic sheet or polymer film. The conductive fibers can be combined with the non-conducting fabric in any suitable, desirable, or practicable way, including those described above or others not explicitly disclosed herein, and all such combinations shall fall within the scope of the present disclosure or appended claims.

Any suitable conductive fibers can be employed that provide sufficient conductivity for providing electromagnetic shielding and that can form fibers suitable for incorporation into a fabric. In various examples disclosed in the incorporated references, the conductive fibers comprise stainless steel, copper, silver, conductive ceramic, conductive polymer, or conductive nanotubes. Any suitable composition of the electromagnetic shielding fabric can be employed. One suitable example is Farabloc® fabric described in incorporated U.S. Pat. Nos. 4,653,473, 4,825,877, 6,146,351, and 6,868,854. In various examples of such fabrics disclosed in the incorporated references, the fabric includes between about 2% and about 35% by weight of the conductive fibers. Other exemplary fabrics can include greater than about 5%, greater than about 10%, greater than about 15%, greater than about 20%, greater than about 25%, or greater than about 30% by weight of the conductive fibers, while still other exemplary fabrics can include less than about 30%, less than about 25%, less than about 20%, less than about 15%, less than about 10%, or less than about 5% by weight of the conductive fibers. Fabrics having greater than 35% by weight of conductive fibers can be employed if suitable, desirable, or practicable. Higher compositions of conductive fiber typically can provide greater electromagnetic shielding, but might also come at a higher cost or weight, or might yield a fabric with other undesirable properties. Any suitably optimized composition can be used in a given situation.

Case Study #1

The first subject is an experienced hunter of mule deer. The subject has been hunting mule deer with bow and rifle for the last 28 years. The subject agreed to wear a garment incorporating electromagnetically shielding fabric (Farabloc® fabric) during an archery mule deer hunt.

During said hunt the subject located two record book class mule deer bucks. One of these two specimens was described as a very large and difficult trophy. The subject was able to stalk within 60 plus yards of both trophy deer, and then waited and watched for an opportunity to harvest one of the bucks with his bow. The subject was forced to wait in an area that offered very little concealment. Both deer looked in his direction several times over about a 30 minute period, during which the subject was able to escape detection by either deer. After that waiting and watching period, he was able to shoot and harvest the larger of the two bucks with his bow. The subject expressed amazement that he was able to stand so close to the two animals and remain undetected by them. He indicated that previous experiences in similar hunting situations had been much different, with the a mature mule deer buck typically able to detect his presence at similar distances. The only difference between this hunt and previous hunts was the addition of the electromagnetically shielding garment.

Case Study #2

Two subjects both wearing garments incorporating electromagnetically shielding fabric (Farabloc® fabric) were stalking elk. Both subjects are very experienced hunters with experience as professional guides. The two subjects stalked into a small group of deer made up of two doe mule deer and two fawn mule deer. The mule deer, ranged from about 40 yards to about 65 yards, saw the hunters but did not display the typical, flighty behavior of mule deer when threatened by a predator. They appeared unconcerned and moved off at a relaxed, leisurely pace. Both subjects had previously experienced similar incidents with very different results. Typically, when mule deer see a stalking predator at a distance between about 40 yards and about 60 yards, they run quickly away. Both subjects had experienced such behavior on previous occasions when not wearing electromagnetically shielding garments. In the incident described above (with the electromagnetically shielding garments), the deer were not alarmed even though both subjects had clearly been seen by the deer.

Case Study #3

The subject, a bowhunter with over 40 years experienced hunting elk, wore prototype electromagnetically shielding clothing (incorporating Farabloc® fabric). During a hunt a young bull elk came within about 10 yards of his position. The elk walked past the subject without even glancing in his direction and then lingered within 20 yards of the hunter for over 5 minutes, in spite of the fact that the hunter was positioned in an open area. The subject stated that he has been that close to elk on many previous occasions (without electromagnetically shielding garments), but has never had one be so oblivious to his presence. He stated that in previous instances, even if elk did not flee immediately they would nearly always look in his direction, show signs of nervousness, and eventually flee.

In addition to the case studies, a more controlled, systematic test of the effect of electromagnetically shielding fabric on animals' perception of the electromagnetic field emanating from a human body is disclosed in a manuscript reproduced in an Appendix attached to this specification.

A method comprises attenuating, while hunting, the electromagnetic field emanated by a hunter within a hunting blind. The hunting blind includes an electromagnetically shielding fabric of any suitable type described herein. Another method can include providing an electromagnetically shielding hunting blind to a hunter and instructing that hunter to remain within the hunting blind while hunting. That method can also include constructing the hunting blind prior to providing it to the hunter. There is no teaching or suggestion in the prior art to attenuate or block electromagnetic fields emanating from a hunter while hunting (or from an observer while observing wildlife), or that such attenuation or blocking would be desirable. There is no teaching or suggestion in the prior art to incorporate electromagnetically shielding fabric into a hunting blind, or that the incorporation of such fabrics would be desirable.

A several examples of a hunting blind 60 is shown in FIGS. 6A-6E. Hunting blind 60 includes electromagnetically shielding fabric 62 arranged to attenuate the electromagnetic field emanating from a hunter within hunting blind 60. The attenuation of the hunter's electromagnetic field enables prey animals to approach the blind more closely before perceiving the hunter's presence within the blind.

Hunting blind 60 can be arranged in any suitable configuration while remaining within the scope of the present disclosure or appended claims. Many examples of hunting blinds can be found in the prior art (some of which are cited above), and any of them can incorporate electromagnetically shielding fabric to attenuate the electromagnetic field emanating from a hunter within the hunting blind. The electromagnetically shielding fabric can be integrated into the structure of the hunting blind, or can be provided as a add-on covering or lining for an existing hunting blind. It may be desirable in many circumstances to arrange the shielding fabric of the hunting blind to substantially completely enclose the hunter in all directions (except for openings provided for viewing the prey and for shooting through), although such complete enclosure may not always be necessary. If the hunting blind is elevated and if such complete enclosure is desired, the shielding fabric can be incorporated into the bottom surface of the blind (below the hunter) as well as into the blind's other surfaces. If the hunting blind rests on the ground, the shielding fabric can be incorporated into the bottom surface of the blind, the shielding fabric can be omitted from the bottom surface, or the blind may not even have a bottom surface; the ground can provide electromagnetic shielding in a downward direction if no shielding fabric is present below the hunter. Blinds that do not substantially enclose the hunter shall also fall within the scope of the present disclosure or appended claims. As with the articles of hunting apparel disclosed above, a hunting blind that incorporates electromagnetically shielding fabric can also include a visual camouflage pattern on at least a portion of its outer surface, or can also include an odor absorber, suppressant, attenuator, or blocker. Any suitable fabric composition (e.g., Farabloc®) can be incorporated into a hunting blind.

It is intended that equivalents of the disclosed exemplary embodiments and methods shall fall within the scope of the present disclosure or appended claims. It is intended that the disclosed exemplary embodiments and methods, and equivalents thereof, may be modified while remaining within the scope of the present disclosure or appended claims.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or", "only one of . . . ", or similar language; or (ii) two or more of the listed alternatives are mutually exclusive within the particular context, in which case "or" would encompass only those combinations involving non-mutually-exclusive alternatives. For purposes of the present disclosure or appended claims, all instances of the words "comprising," "including," "having," and variants thereof shall be construed as open ended terminology, with the same meaning as if the phrase "at least" were appended after each instance thereof.

Appendix

The following manuscript was prepared at the direction of the inventors in the course of testing the electromagnetically shielding articles of apparel disclosed herein, and has been included without further editing or alteration. Added Note: All blocking garments used in the disclosed experiments were constructed using Farabloc® fabric as the EMF blocking material.

Title: The use of EMF (electromagnetic field) blocking garments reduces the ability of animals to detect a human subject.

Author: Ted W Netter; BS General Agriculture, Oregon State University, Post Graduate studies in Agriculture Education and Animal Science.

Abstract: Animals have an uncanny ability to detect the proximity of humans, this study explores the hypothesis that animals sense EMF (electromagnetic field) emissions produced by the human body. The behavior of three species of animals (Cattle, Horses, and Mule Deer) was observed while interacting with a human subject both with and without EMF (electromagnetic field) blocking garments. The results of this study find that the use of EMF blocking garments allow humans to approach 69 to 75 percent closer to Mule Deer than without their use. The results also show that the use of EMF blocking garments is more effective when the human subject remains motionless. Overall the study finds that using EMF blocking garments makes a human significantly less-detectable by animals.

Introduction: I was presented with the Hypothesis that animals (specifically wild game animals) have the ability to detect some kind of electromagnetic Field (EMF) or Extremely Low Frequency (ELF) energy, that is produced by the Human Body and that by blocking or attenuating this energy a person would be less detectable by wild animals. Having briefly studied the effects of High Power Transmission Lines on Animals at Oregon State University I was intrigued by the Hypothesis and initiated the following research. By breaking the hypothesis down to its root elements I found several questions I must answer. First what is EMF? Second how is EMF measured? Third can EMF be blocked? Fourth do humans emit some kind of measurable EMF energy? Fifth do animals sense or react to any type of non directed EMF signal or energy.

EMF has a broad definition; to fully understand it one must include electromagnetic field, electromagnetic radiation, and electromagnetic spectrum in the definition.

The electromagnetic field is a physical field produced by electrically charged objects. It affects the behavior of charged objects in the vicinity of the field. The electromagnetic field extends indefinitely throughout space and describes the electromagnetic interaction. It is one of the four fundamental forces of nature (Wikipedia; NASA).

Electromagnetic radiation (sometimes abbreviated EMR) takes the form of self-propagating waves in a vacuum or in mater. EM radiation has an electric and magnetic field component which oscillates in phase perpendicular to each other and to the direction of energy propagation. Electromagnetic radiation is classified into types according to the frequency of the wave. EMR carries energy and momentum, which may be imparted when it interacts with matter (Wikipedia; NASA).

The electromagnetic (EM) spectrum is the range of all possible electromagnetic radiation frequencies. The electromagnetic spectrum extends from below the frequencies used for modern radio communication (at the long-wavelength end) through gamma radiation (at the short-wavelength end), covering wavelengths from thousands of kilometers down to a fraction the size of an atom (Wikipedia; NASA).

EMF is mainly characterized by its frequency and its strength. The frequency of EMF is measured in the unit hertz, which means "cycles per second". The strength of low frequency EMF (such as that produced by humans) is measured in Milligauss or Microtesla (one Microtesla equals ten Milligauss) (how to measure EMF, Eriksen Andrew, MS).

The most recognized method for blocking EMF is the Faraday Cage. A Faraday cage is a metallic enclosure that prevents the entry or escape of an electromagnetic field, Faraday cages can be built of solid metal shielding, metallic mesh, or other material that contain conductive fibers.

The human body produces conducts, and stores electricity, and therefore EMF. The most common recognition of human produced electricity is through EKG, and EEG. The fact that humans conduct electricity is proven by simple devises such as an electric fence. A good example of humans storing electricity is building up a "static electric" charge and sharing it with a friend. EKG (electrocardiogram) is a test that measures the electrical activity of the heartbeat. With each beat, an electrical impulse (or wave) travels through the heart (American heart association). EEG (electroencephalogram) is a test that measures and records the electrical activity of your brain (webMD).

I found two studies that show evidence of electromagnetic radiation affecting animal behavior. W. Löscher and G. Käs (Authors) Conspicuous behavioral abnormalities in a dairy cow herd near a TV and Radio transmitting antenna. Prakt. Tierarzt 79: 5, 437-444 (1998) [Practical Veterinary Surgeon 79: 5, 437-444 (1998)]. Löscher and Käs found that a cow with abnormal behavior brought to a stable in a different area resulted in normalization of the cow within five days. The symptoms returned, however, when the cow was brought back to the stable in close proximity to the antenna in question. In view of the previously known effects of electromagnetic fields it may be possible that the observed abnormalities are related to the electromagnetic field exposure.

The Department of Pharmacology, Silesian Academy of Medicine Katowice, Poland; Bioelectromagnetics 1993; 14(4): 287-97. Found that rats exposed to EMF (ELF) exhibited an increase or decrease in irritability depending on field strength and duration. They concluded that irritability of rats may be used as a simple behavioral indicant of mammalian sensitivity to magnetic fields.

This study specifically addresses the question: Do animals sense and react to human produced EMF, and does blocking human produced EMF make a person less detectable by animals?

Methods: My first area of study is how much EMF does a human produce, and can it be blocked? To explore this I set up the following experiment.

Experiment 1: Human EMF

Using a TriField Natural EM Meter, I located an area of low static EMF levels (the static level stayed between 0.25 and 0.33 microteslas or 2.5 to 3.3 milliguass). The experiment requires two people. First the EM meter is set up on a non-conductive platform at chest height of the experiment subject. Second the EM meter is calibrated to read a subject passing in front of it. Third an observation post is set up 15 feet behind and 10 feet higher than the meter, the person observing and recording the meter readings will use binoculars to insure accurate readings and no interference with the meters readings. Fourth a subject not wearing EMF blocking material will pass by the meter at a distance of no greater than 6 inches, but not touching the meter or the non conductive platform at a slow walk this will be repeated 10 times at no less than a 30 second interval, the observer will record the highest reading on the meter for each pass. The subject will then put on EMF blocking garments and repeat the experiment (the EMF blocking garments include undergarment pants that cover the body from the ankles to the waist, an undergarment shirt that covers from the neck to the wrists and over laps the pants, and a head net that goes under a hat and hangs down to overlap the shirt).

Experiment 2: Animal Behavior

In order to test animal's ability to sense and therefore react to human produced EMF, I set up the following experiments. Observe animal behavior while interacting with a human subject both with and without the use of EMF blocking material. For this experiment I chose the following animals, Cattle, Horses, and wild Mule Deer. These animals were chosen for, availability to the researcher, past history observing their behavior and availability of research on their behavior. In order to keep this study simple and repeatable I limited human interaction with the animals to one human subject at a time. All measurements are done in either Feet or Yards and are completed by physical measurement, and or use of a laser range finder, distance estimates are used when measurement during the experiment would affect results. Numbers of animals observed are exact where possible and estimated when an exact count is impossible. Efforts are made to mask means of detection by the animals other than EMF energy, specifically Camouflage clothing is used along with natural cover to disguise the human subject, no scent suppression is used other than that available in the natural environment, experiments are designed to use wind direction to help mask the subjects scent, experiments are designed to minimizes animals prior knowledge of the location of the subject, movement and noise during the experiment are limited to sounds and motion required to complete the experiment, all data from the experiments will be cataloged mentally by the subject and recorded at the end of the experiment session, or cataloged and recorded physically by a third party using long range observation. Experiments A-Ff will be the control experiments and will be conducted without EMF blocking material.

The experiments conducted with the EMF blocking material are labeled A2-Ff2. The EMF blocking material includes undergarment pants that cover the body from the ankles to the waist, an undergarment shirt that covers from the neck to the wrists and over laps the pants, and a head net that goes under a hat and hangs down to overlap the shirt. This will be worn along with the same outer garments used in the control experiments.

Experiment A: Cattle

Cattle are observed while moving through a fixed choke point from rest to feed and water without pressure. This experiment must use an established travel route that the cattle have had exposure to for at least 5 consecutive days. The choke point should be between 12 and 16 feet wide (for my experiment I used a 14 foot gateway). The human subject is positioned on the side of the opening at which the cattle are at rest 12 feet from the opening on a parallel line to the opening seated on the ground and using natural cover (leaning back against the fence) See FIG. 5A and the legend in FIG. 5D. The Human subject will take up their observation point no later than one half hour before cattle are normally given access to their feed source, and only if no cattle are present at the choke point, or are near or observing the choke point. The human subject will observe the cattle and mentally catalog data from their observation point minimizing movement, noise, eye contact or any other interaction with the cattle Observation of the cattle behavior will continue for one half hour after the first Bovine approaches the choke point opening.

Experiment B: Cattle

The reaction of cattle is observed while a human subject moves directly at them in an open field starting from a distance of no less than 150 yards the human subject will move slowly towards the cattle stopping and taking a yardage reading with a range finder when directly observed by cattle or cattle start to move away from the human subject. The human subject will try to approach as close as possible to the cattle without them running off from the subject.

Experiment C: Horse

Horses are observed while moving from rest to feed without pressure through an alleyway (see FIG. 5B and the legend in FIG. 5D) The human subject is positioned on the side of and halfway down a 14 ft wide 200 ft long alleyway that connects a horse paddock to a pasture. These horses go down this particular alleyway twice a day on their way out to the pasture there is no pressure from a herdsman, on the way in from the pasture herding pressure is used. For this experiment the horses were observed while going out to pasture without herding pressure. The human subject will take up the observation post 10 min before the horses are to be turned out and will be standing up against a fence for safety reasons (preliminary studies show that the horses were often running 3 wide by the time they reached the observation point). The human subject will observe the horses and mentally catalog data from their observation point minimizing movement, noise, eye contact or any other interaction with the horses. Observation will continue until the horses move to a point 50 feet beyond the observation point.

Experiment D: Horse

The reaction of horses is observed while a human subject moves directly at them in an open field starting from a distance of no less than 150 yards the human subject will move slowly towards the horses stopping and taking a yardage reading with a range finder when directly observed by the horse or the horses start to move away from the human subject. The human subject will try to approach as close as possible to the horses without them running off from the subject.

Experiment E: Wild Mule Deer

Mule Deer are observed while moving from their bed grounds (a state of rest) to feed and water. This experiment uses a known travel route of deer between a ridge where they rest, a pond where they water and a field they have been actively grazing (see FIG. 5C and the legend in FIG. 5D). Preliminary studies show that small groups of deer (2-5 at a time) have been using this travel every afternoon for at least 3 days before the study. The human subject will position themselves 12 to 20 feet off to the side of the established deer trail, at a location that gives the subject a good view of the deer trail for at least 50 yards in the direction the deer will be coming from. The subject will use the best natural cover available and be in the seated position (to minimize movement do to fatigue). The human subject will mentally catalogue data while deer are present and record data and make measurements with the range finder only when deer are not present.

Experiment F: Wild Mule Deer

The reactions of Mule Deer are observed while a human subject moves directly at them in an open field. Starting from a distance of no less than 150 yards the human subject will move slowly towards the deer stopping and taking a yardage reading with a range finder when directly observed by the deer or the deer start to move away from the human subject. The human subject will try to approach as close as possible to the deer without them running off from the subject.

Experiment Ff: Mule Deer

The reactions of Mule Deer are observed while being stalked by a human subject. The subject will only move or take readings when the deer have their heads down and are feeding, not observing the human subject. The human subject will try to approach as close to the deer as possible up until they leave the field.

Results:

Experiment 1: How much EMF does a human produce, and can it be blocked?

All readings are expressed in microteslas, to convert readings to milligauss multiply the reading by ten.

Column A represents the use of EMF blocking material (W=readings taken with EMF blocking material, WO=readings taken without EMF blocking material).

Columns B-K represents individual test results (these have no direct correlation to each other they are simply raw readings).

The Column labeled AVG is the average reading for the test session.

| A  | B   | C   | D   | E   | F   | G   | H   | I   | J   | K   | AVG  |
|----|-----|-----|-----|-----|-----|-----|-----|-----|-----|-----|------|
| WO | 4.2 | 3.7 | 4.8 | 4.8 | 4.3 | 3.9 | 4   | 4.5 | 4.2 | 4   | 4.24 |
| W  | 1.9 | 2.2 | 2   | 2   | 2.3 | 1.7 | 1.7 | 2.1 | 2   | 1.9 | 1.98 |

Results of note: The data table in experiment 1 shows that the use of EMF blocking material reduces the EM field strength of the human body by 53 percent on average. Further analysis of the data shows a potential minimum of 38 percent and a maximum of 65 percent. Overall results the human body does produce measurable amounts of EMF, and human produced EMF can be blocked using the proper material.

Experiment A: Cattle are observed by a human subject (without EMF blocking material) moving through a fixed choke point from rest to feed and water.

52 head of weaned calves used in this experiment

Column A represents the experiment session.

Column B represents the number of cattle.

Column C represents the distance at which the cattle first observe and react to human subject (ND=no detection).

Column D represents the reaction of the cattle to the human subject (S=stop and stare, MA=move around, NR=no reaction, R=retreat, A=approach). Reactions are listed in order of how they happened.

Column E represents the distance from human subject when the cattle start to move to the choke point.

Column F represents how the cattle move through the choke point (W=walk, F=fast walk, R=run).

| A   | B   | C        | D          | E        | F   |
|-----|-----|----------|------------|----------|-----|
| 1   | 7   | 30 yds   | S, MA, A   | 20 yds   | F, R |
| 1   | 4   | 37 yds   | S, A, MA   | 29 yds   | R   |
| 1   | 11  | 32 yds   | S, R, A, MA | 21 yds  | R   |
| 2   | 15  | 35 yds   | S, R, MA, A | 15 yds  | F, R |
| 2   | 6   | 29 yds   | S, A, MA   | 18 yd    | F   |
| 2   | 23  | 40 yds   | S, A, S, MA | 22 yds  | R   |
| 3   | 10  | 25 yds   | S, R, MA, A | 11 yds  | F, R |
| 3   | 13  | 30 yds   | S, A, S    | 20 yds   | F   |
| 3   | 8   | 27 yds   | S, MA, A   | 15 yds   | R   |
| 3   | 2   | 20 yds   | S, A       | 12 yds   | R   |
| AVG | 9.9 | 30.5 yds | NA         | 18.3 yds | NA  |

Results of note: All groups of calves, if not every single calf in each session detected and had some reaction to the test subject. Groups of calves spent between 30 seconds and 3 minutes observing and reacting to the subject. Not all of the cattle observed in this experiment passed through the choke point within the 30 minute sessions.

Experiment A2: Cattle are observed by a human subject (using EMF blocking material) moving through a fixed choke point from rest to feed and water.

52 head of weaned calves used in this experiment

Column A represents the experiment session.

Column B represents the number of cattle.

Column C represents the distance at which the cattle first observe and react to human subject (ND=no detection).

Column D represents the reaction of the cattle to the human subject (S=stop and stare, MA=move around, NR=no reaction, R=retreat, A=approach). Reactions are listed in order of how they happened.

Column E represents the distance from human subject when the cattle start to move to the choke point.

Column F represents how the cattle move through the choke point (W=walk, F=fast walk, R=run).

| A | B | C | D | E | F |
|---|---|---|---|---|---|
| 1 | 14 | 10 yds | S, A | 7 yds | W, F |
| 1 | 8 | ND | NR | NA | W |
| 1 | 22 | 7 yds | S, NR | 7 yds | W |
| 1 | 8 | 12 yds | S, A, A, A | 5 yds | W, F |
| 2 | 12 | ND | NR | NA | F |
| 2 | 16 | 12 yds | S, A | 9 yds | W |
| 2 | 6 | 10 yds | S, NR | 10 yds | W |
| 2 | 10 | 7 yds | NR | 7 yds | W |
| 2 | 8 | ND | NR | NA | F, R |
| 3 | 7 | 10 yds | S, NR | 10 yds | W |
| 3 | 16 | 7 yds | NR | 7 yds | W |
| 3 | 4 | ND | NR | NA | F |
| 3 | 25 | 12 yds | NR | 12 yds | W |
| AVG | 12 | 9.67 yds | NA | 8.22 yds | NA |

Results of note: Not all groups of calves or individual calves in the groups detected or had a reaction to the test subject. 36 percent of the groups of calves in this experiment did not detect the test subject. 64 percent of the groups of cattle had no reaction to the subject. 27 percent of the groups of calves that detected the subject had no reaction other than looking at the subject. Calves that detected the subject spent no more than 45 seconds reacting to the subject.

Experiment A-A2 comparative results: On average the calves in A2 came 68 percent closer to the subject before they detected the subject than the calves in A. On average the calves in A2 passed through the choke point 55 percent closer to the subject than the calves in A.

Experiment B: The reaction of cattle is observed while a human subject moves directly at them in an open field (without EMF blocking material).

Column A represents the experiment session.
Column B is the starting distance from the animals.
Column C is the distance at which the animals first detect the human subject.
Column D is the distance at which the animals first react to the human subject.
Column E is the distance at which the animals actively react to the human subject.
Column F is the closest distance between the human subject and the animals.
The row marked AVG is the average distance for the experiment.

| A | B | C | D | E | F |
|---|---|---|---|---|---|
| 1 | 225 yds | 200 yds | 125 yds | 3 yds | 3 yds |
| 2 | 180 yds | 160 yds | 130 yds | 3 yds | 3 yds |
| 3 | 200 yds | 165 yds | 110 yds | 3 yds | 3 yds |
| AVG | 201.67 yds | 175 yds | 121.67 yds | 3 yds | 3 yds |

Results of note: The cattle in this experiment did not run away from the test subject, but they would move away and around the subject if the subject got within 9-10 feet of them. Once the subject entered the group of cattle most cattle that were farther than 15 yards from the subject went on feeding and did not react to the subject.

Experiment B2: The reaction of cattle is observed while a human subject moves directly at them in an open field (using EMF blocking material).

Column A represents the experiment session.
Column B is the starting distance from the animals.
Column C is the distance at which the animals first detect the human subject.
Column D is the distance at which the animals first react to the human subject.
Column E is the distance at which the animals actively react to the human subject.
Column F is the closest distance between the human subject and the animals.
The row marked AVG is the average distance for the experiment.

| A | B | C | D | E | F |
|---|---|---|---|---|---|
| 1 | 185 yds | 150 yds | 100 yds | 40 yds | 20 yds |
| 2 | 215 yds | 170 yds | 105 yds | 55 yds | 22 yds |
| 3 | 175 yds | 140 yds | 90 yds | 30 yds | 15 yds |
| AVG | 191.67 yds | 153.33 yds | 98.33 yds | 41.67 yds | 19 yds |

Results of note: Cattle actively avoided the test subject when the subject approached within 42 yards on average. All cattle in group reacted to the test subject when subject entered the group of cattle.

Experiment B-B2 comparative results: Even though the subject in B2 was able to approach closer to the cattle without being detected, the subject got closer to the cattle without them actively reacting in experiment B.

Experiment C: Horses are observed while moving from rest to feed without pressure through an alleyway (without EMF blocking material). 14 horses were observed in this experiment Session one: Horses enter the alleyway as a group jogging; the lead horse starts to slow down 30 yards from the subject. All horses slow to a stop and look at the subject at 20 yards, several horses walk toward the subject, all horses follow and stop at 10 yards. Three horses move to the far side of the alleyway, passing by the subject and continuing down the alleyway, once the three horses start running the rest of the horses move past the subject and down the alleyway.

Session two: The horses enter the alleyway running three horses wide, at 35 yards the lead horse moves to the far side of the alley, the rest of the horses slow and move behind the lead horse. All of the horses run by the subject on the far side of the alleyway.

Session three: The horses enter the alleyway in a group, at a jog. All of the horses stay in a group until they are 10 feet from the subject. Four of the horses slow and stop by the subject; most of the horses go by the subject at a jog, several horses stop after passing the subject, one of these horses' snorts and runs off, the rest of the horses follow running off.

Results of note: All horses in all three sessions both detected and reacted to the test subject. During session three the four horses that approach the subject react to the subject for approximately 30 seconds before passing the subject.

Experiment C2: Horses are observed while moving from rest to feed without pressure through an alleyway (using EMF blocking material). 14 horses were observed in this experiment Session one: The horses enter the alleyway, running in a long group. The horses keep running the length of the alleyway passing 5 feet from the subject.

Session two: The horses enter the alleyway in two groups jogging. The horses move the length of the alleyway at a jog, passing the subject at 5-6 feet.

Session three: The horses enter the alleyway running in a tight group four horses wide. The horses run the length of the alley way, one horse runs within 3 feet of the subject.

Results of note: None of the horses in these sessions showed any detection of or reaction to the subject. None of these sessions lasted longer than 25 seconds. In session three the subject almost got run into by a paint horse.

Experiment D: The reaction of horses is observed while a human subject moves directly at them in an open field (without EMF blocking material).

Column A represents the experiment session.
Column B is the starting distance from the animals.
Column C is the distance at which the animals first detect the human subject.
Column D is the distance at which the animals first react to the human subject.
Column E is the distance at which the animals actively react to the human subject.
Column F is the closest distance between the human subject and the animals.

The row marked AVG is the average distance for the experiment.

| A | B | C | D | E | F |
|---|---|---|---|---|---|
| 1 | 165 yds | 140 yds | 120 yds | 90 yds | 15 yds |
| 2 | 180 yds | 165 yds | 135 yds | 95 yds | 15 yds |
| 3 | 155 yds | 135 yds | 115 yds | 80 yds | 10 yds |
| AVG | 166.67 yds | 146.67 yds | 123.33 yds | 88.33 yds | 13.33 yds |

Results of note: The standard reaction of the horses was to group up when approached by the subject. The horses did not continually keep track of the subjects' progress towards them. Horses appeared calm as subject approached close to the group.

Experiment D2: The reaction of horses is observed while a human subject moves directly at them in an open field (using EMF blocking material).

Column A represents the experiment session.
Column B is the starting distance from the animals.
Column C is the distance at which the animals first detect the human subject.
Column D is the distance at which the animals first react to the human subject.
Column E is the distance at which the animals actively react to the human subject.
Column F is the closest distance between the human subject and the animals.

The row marked AVG is the average distance for the experiment.

| A | B | C | D | E | F |
|---|---|---|---|---|---|
| 1 | 170 yds | 130 yds | 125 yds | 80 yds | 20 yds |
| 2 | 185 yds | 125 yds | 115 yds | 75 yds | 17 yds |
| 3 | 150 yds | 110 yds | 100 yds | 75 yds | 11 yds |
| AVG | 168.33 yds | 121.67 yds | 113.33 yds | 76.67 yds | 16 yds |

Results of note: Most of the horses continually kept track of the subjects' progress towards them. The standard reaction of the horses was to group up when approached by the subject, however in session one, two horses moved between the group and the subject. Horses seemed alarmed when subject approached close to the group of horses.

Experiment D-D2 comparative results: The largest change in results between D, and D2 is not represented in the data, but by the horses' attitude, without EMF blocking material they are calm, with the use of it they appeared alarmed by the subjects' presence.

Experiment E: Mule Deer are observed while moving from their bed grounds (a state of rest) to feed and water (without EMF blocking material).

Column A represents experiment session.
Column B represents the number of deer observed.
Column C represents the distance at which the deer are first observed.
Column D represents the distance at which the deer first detect the subject (ND=deer never detect subject).
Column E represents the reaction of the deer when they detect the subject (S=stop and stare, A=approach, R=retreat, MA=move around or away from, AL=makes alarm sound or movement, L=look at, NR=no reaction).
Column F represents the speed at which the deer travel after detecting the subject, or the speed at which they pass by the subject (W=walk, F=fast walk, R=run).
Column G represents the closest the deer get to the subject.

| A | B | C | D | E | F | G |
|---|---|---|---|---|---|---|
| 1 | 3 | 85 yds | 52 yds | S, MA | F | 52 yds |
| 1 | 1 | 100 yds | 85 yds | MA | F | 80 yds |
| 1 | 4 | 85 yds | 65 yds | S, AL, MA | R | 50 yds |
| 1 | 22 deer observed in field at the close of session | | | | | |
| 2 | 3 | 70 yds | 60 yds | S, MA | F | 45 yds |
| 2 | 5 | 68 yds | 55 yds | S, A, S, AL | F, R | 30 yds |
| 2 | 2 | 100 yds | 70 yds | S, MA, AL | F, R | 52 yds |
| 2 | 4 | 75 yds | 50 yds | S, AL, MA | R | 50 yds |
| 2 | 17 deer observed in field at the close of session | | | | | |
| 3 | 1 | 50 yds | 50 yds | S, A, AL, MA | R | 40 yds |
| 3 | 6 | 65 yds | 47 yds | S, MA, A, AL | R | 35 yds |
| 3 | 25 deer observed in field at the close of session | | | | | |
| AVG | 3.22 | 77.56 yds | 59.33 yds | NA | NA | 48.22 yds |

Results of note: All groups of deer if not all deer individually detected and reacted to the test subject. In 67 percent of the groups of deer, one or more of the deer made an alarm sound or movement upon detecting the subject, 67 percent of the groups also reacted by running from or past the subject. 89 percent of the deer got closer to the subject after the subject spotted the deer. 78 percent of the deer got closer to the subject after they detected the subject.

Experiment E2: Mule Deer are observed while moving from their bed grounds (a state of rest) to feed and water (Using EMF blocking material).

Column A represents experiment session.
Column B represents the number of deer observed.
Column C represents the distance at which the deer are first observed.
Column D represents the distance at which the deer first detect the subject (ND=deer never detect subject).
Column E represents the reaction of the deer when they detect the subject (S=stop and stare, A=approach, R=retreat, MA=move around or away from, AL=makes alarm sound or movement, L=look at, NR=no reaction).
Column F represents the speed at which the deer travel after detecting the subject, or the speed at which they pass by the subject (W=walk, F=fast walk, R=run).

| A | B | C | D | E | F | G |
|---|---|---|---|---|---|---|
| 1 | 4 | 72 yds | 6 yds | L, NR | W | 6 yds |
| 1 | 1 | 100 yds | ND | NR | W | 30 yds |
| 1 | 3 | 82 yds | 10 yds | L, S, NR | W | 10 yds |
| 1 | 6 | 60 yds | ND | NR | FW | 10 yds |
| 1 | 27 deer observed in field at the close of session | | | | | |
| 2 | 2 | 90 yds | ND | NR | W | 15 yds |
| 2 | 4 | 65 yds | 9 yds | L, NR | W | 9 yds |
| 2 | 5 | 75 yds | 15 yds | L, A, S, MA | W | 10 yds |
| 2 | 3 | 85 yds | ND | NR | W | 25 yds |
| 2 | 1 | 35 yds | ND | NR | W | 15 yds |
| 2 | 31 deer observed in field at the close of session | | | | | |
| 3 | 1 | 40 yds | 12 yds | L | W | 12 yds |
| 3 | 7 | 90 yds | ND | NR | W | 20 yds |
| 3 | 3 | 70 yds | 13 yds | L | W | 13 yds |
| 3 | 3 | 50 yds | 15 yds | L, A, L | W | 10 yds |
| 3 | 24 deer observed in field at the close of session | | | | | |
| AVG | 3.31 | 70.31 yds | 11.43 yds | NA | NA | 14.23 yds |

Results of note: 46 percent of the groups of deer did not detect the test subject. Only one of the seven groups (14%) of deer that detected the subject moved around or away from the subject. None of the deer that detected the subject moved faster than a walk after detecting the subject. None of the deer made an alarm sound or movement after detecting the subject. 100 percent of the deer got closer to the subject after the subject spotted them. 29 percent of the deer that detected the subject got closer to the subject after they detected the subject.

Experiment E-E2 comparative results: On average the deer that detected the subject in E2 got 81 percent (47.9 yards) closer to the subject before detection than the deer that detected the subject in E. On average the closest distance to the deer in E2 was 14.23 yards, that's 33.99 yards closer than in E. 100 percent of the deer in experiment E avoided the subject by moving away from or around the subject all of those deer did so at a fast walk or run, only 8 percent of the deer in experiment E2 moved away from or around the subject, and those deer did so at a walk.

Experiment F: The reactions of Mule Deer are observed while a human subject moves directly at them in an open field (without EMF blocking material).

Column A represents the experiment session.
Column B is the number of deer in the group being stalked
Column C is the starting distance from the deer.
Column D is the distance at which the deer first detect the human subject.
Column E is the distance at which the deer first react to the human subject.
Column F is the distance at which the deer actively move away from the human subject.
Column G is the closest distance between the human subject and the deer.
The row marked AVG is the average distance for the experiment.

| A | B | C | D | E | F | G |
|---|---|---|---|---|---|---|
| 1 | 7 | 212 yds | 212 yds | 200 yds | 180 yds | 180 yds |
| 2 | 9 | 185 yds | 171 yds | 165 yds | 160 yds | 160 yds |
| 3 | 5 | 163 yds | 163 yds | 163 yds | 200 yds | 163 yds |
| AVG | 7 | 186.67 yds | 182 yds | 176 yds | 180 yds | 167.67 yds |

Results of note: In session three the deer observed the human subject entering the field, and immediately started feeding and moving away from the subject, when the subject moved toward the deer, the deer ran out of the field after the subject had moved around 30 yards towards them. In all three sessions the deer detected the subject within the first 14 yards of the subject moving toward the deer. Once the subject was detected by the deer at least one deer always kept track of the subject, even after running away.

Experiment F2: The reactions of Mule Deer are observed while a human subject moves directly at them in an open field (using EMF blocking material).

Column A represents the experiment session.
Column B is the number of deer in the group being stalked
Column C is the starting distance from the deer.
Column D is the distance at which the deer first detect the human subject.
Column E is the distance at which the deer first react to the human subject.
Column F is the distance at which the deer actively move away from the human subject.
Column G is the closest distance between the human subject and the deer.
The row marked AVG is the average distance for the experiment.

| A | B | C | D | E | F | G |
|---|---|---|---|---|---|---|
| 1 | 5 | 185 yds | 160 yds | 125 yds | 71 yds | 60 yds |
| 2 | 8 | 230 yds | 190 yds | 130 yds | 75 yds | 50 yds |
| 3 | 8 | 160 yds | 160 yds | 105 yds | 70 yds | 47 yds |
| AVG | 7 | 191.67 yds | 170 yds | 120 yds | 72 yds | 52.33 yds |

Results of note: In two of the three sessions the subject progressed 25 yards or further toward the deer without being detected upon entering the field. In all three sessions the deer did not continuously keep track of the subject after they first detected the subject. Individual deer in all three sessions allowed the subject to get closer to them after they had already actively moved away from the subject.

Experiment F-F2 comparative results: The subject progressed over 115 yards closer to the deer on average in experiment D2 as compared to D. The subject progressed 56 yards closer to the deer on average before the deer reacted to the subject in D2 as compared to D.

Experiment Ff: The reactions of Mule Deer are observed while being stalked by a human subject. The subject will only move or take readings when the deer have their heads down and are feeding, not observing the human subject (without EMF blocking material).

Column A represents the experiment session.
Column B is the number of deer in the group being stalked
Column C is the starting distance from the deer.
Column D is the distance at which the deer first detect the human subject.
Column E is the distance at which the deer first react to the human subject.
Column F is the distance at which the deer actively move away from the human subject.
Column G is the closest distance between the human subject and the deer.
The row marked AVG is the average distance for the experiment.

| A | B | C | D | E | F | G |
|---|---|---|---|---|---|---|
| 1 | 10 | 200 yds | 155 yds | 125 yds | 120 yds | 120 yds |
| 2 | 6 | 170 yds | 160 yds | 155 yds | 133 yds | 133 yds |
| 3 | 7 | 240 yds | 185 yds | 150 yds | 145 yds | 120 yds |
| AVG | 7.67 | 203.33 yds | 166.67 yds | 143.33 yds | 132.67 yds | 124.33 yds |

Results of note: In all three sessions the subject progressed 10 yards or farther into the field before being detected. In two of the three sessions the subject got no closer to the deer after they had started to actively move away from the subject. In all three sessions the subject progressed 33 yards or farther toward the deer before they started to actively move away.

Experiment Ff2: The reactions of Mule Deer are observed while being stalked by a human subject. The subject will only move or take readings when the deer have their heads down and are feeding, not observing the human subject (using EMF blocking material).

Column A represents the experiment session.
Column B is the number of deer in the group being stalked
Column C is the starting distance from the deer.
Column D is the distance at which the deer first detect the human subject.
Column E is the distance at which the deer first react to the human subject.
Column F is the distance at which the deer actively move away from the human subject.
Column G is the closest distance between the human subject and the deer.
The row marked AVG is the average distance for the experiment.

| A | B | C | D | E | F | G |
|---|---|---|---|---|---|---|
| 1 | 9 | 220 yds | 105 yds | 85 yds | 55 yds | 40 yds |
| 2 | 11 | 160 yds | 20 yds | 20 yds | 35 yds | 20 yds |
| 3 | 5 | 180 yds | 140 yds | 90 yds | 60 yds | 35 yds |
| AVG | 8.33 | 186.67 yds | 88.33 yds | 65 yds | 50 yds | 31.67 yds |

Results of note: In session two the subject progressed to within 50 yards of the deer when they start to feed toward the subject, several horses in the field approach the subject to within 30 yards and snort at subject; the deer continue to feed toward the subject even though the wind direction has changed and is blowing from the subject directly at the deer, the deer continue to feed directly at the subject and two deer close to 20 yards, the horses then stamp and blow and the deer look at the subject and start to feed away, the deer finally actively react to the subject at 35 yards. In two of the three sessions the subject progresses more than 100 yards toward the deer before being detected. In all three sessions subject approaches deer to within 40 yards.

Experiment Ff-Ff2 comparative results: The subject progressed over 92 yards closer to the deer on average in experiment Ff2 as compared to Ff. The subject progressed over 78 yards closer to the deer on average before the deer reacted to the subject in Ff2 as compared to Ff.

Discussion: Taking into consideration the results from all of the experiments I reach the following conclusions; humans do produce and emit some level of EMF, that EMF can be reduced by the use of EMF blocking garments. Animals do sense or detect EMF produced by humans, and blocking or reducing EMF emissions makes humans less-detectable by animals. There are several specific examples in the previous experiments that EMF blocking has a profound effect on the ability of deer to detect and recognize humans. First in experiment E2 fifteen mule deer looked at the subject in the experiment, yet still approached the subject to within 10 yards or less (3 deer to 6 yards) and had no reaction to the subject, they did not act alarmed, or run away, they simply walked off. Compare that to experiment E, and the closest a deer got to the subject was 30 yards and that deer both acted alarmed and ran off. In experiment Ff2 deer feed and walked toward the subject in an open field, looked directly at the subject, watched horses react to the subjects' presence, yet still continued to feed and walk toward the subject eventually coming within 20 yards of the subject. These past two examples have something in common, the subject was not moving, and looking at the data EMF blocking has the most effect on animals when the human subject is not moving. Another area of this study also needs to be discussed, the cattle and horses used in this experiment are "tame" farm animals, they are accustom to people being around them, and during the course of this experiment the subject became very familiar with the animals. During the control portion of the experiment the horses and cattle acted similar toward the subject as they do to their owners and care takers, however when the subject was wearing the EMF blocking garments, the cattle and especially the horses, acted as if they did not recognize the subject as a human when the subject was walking toward or through them. When the subject was not moving however the cattle and horses rarely detected the presence of the subject. In closing the data generated by this study leads me to believe that EMF blocking makes humans significantly less-detectable by animals.

Sources:

W. Löscher and G. Käs (Authors) Conspicuous behavioral abnormalities in a dairy cow herd near a TV and Radio transmitting antenna. Prakt. Tierarzt 79: 5, 437-444 (1998) [Practical Veterinary Surgeon 79: 5, 437-444 (1998)] Schlütersche GmbH & Co. KG, Verlag und Druckerei [Schlütersche GmbH & Co. KG, Publisher and Printer] ISSN 0032-681 X Trzeciak H I, Grzesikj, Bortel M, Kuska R, Duda D, Michnik J, Malecki A; Behavioral effects of long-term exposure to magnetic fields in rats. Bioelectromagnetics. 1993;14(4):287-97 http://en.wikipedia.org/wiki/Electromagnetic_field
http://en.wikipedia.org/wiki/Electromagnetic_spectrum
http://en.wikipedia.org/wiki/Electromagnetic_radiation
http://imagine.gsfc.nasa.gov/docs/science/know_l1/em-spectrum.html
http://www-spof.gsfc.nasa.gov/Education/Imagnet.html
http://www.americanheart.org/presenter.jhtml?identifier=3005172
http://www.webmd.com/epilepsy/electroencephalogram-eeg-21508
http://www.eiwellspring.org/HowToMeasureEMF.htm
http://www.farabloc.com

What is claimed is:

1. A method comprising attenuating, while handling a non-human animal, one's own emanated electromagnetic field by wearing at least one article of apparel that includes an electromagnetically shielding fabric, which shielding fabric comprises a substantially continuous system of conductive fibers combined with a non-conductive fabric and attenuates the emanated electromagnetic field at frequencies less than about 1 gigahertz, wherein said attenuating of one's own emanated electromagnetic field at frequencies less than about 1 gigahertz decreases the likelihood of a reaction by the animal to one's own emotional response or emotional state, and wherein handling the animal comprises one or more of (i) holding or touching the animal, directly or using equipment, (ii) feeding the animal, (iii) herding or restraining the animal, (iv) riding the animal, (v) using the animal to pull or push a vehicle, object, or equipment, (vi) training the animal, (vii) using the animal in a performance, display, or demonstration, or (viii) conducting a veterinary examination on the animal.

2. The method of claim 1 wherein the conductive fibers are intermingled with non-conductive fibers that form the non-conducting fabric.

3. The method of claim 1 wherein the conductive fibers are applied to a surface of the non-conducting fabric.

4. The method of claim 1 wherein at least one said article of apparel comprises an article of clothing, footwear, headwear, or eyewear.

5. The method of claim 1 wherein at least one said article of apparel includes an odor absorber, suppressant, attenuator, or blocker.

6. The method of claim 1 wherein the shielding fabric includes between about 2% and about 35% by weight of the conductive fibers.

7. The method of claim 1 wherein the conductive fibers comprises stainless steel fibers.

8. The method of claim 1 wherein the conductive fibers comprise copper, silver, conductive ceramic, conductive polymer, or conductive nanotubes.

9. A method comprising attenuating, while a user is handling a non-human animal, the user's emanated electromagnetic field by:
   providing to the user at least one article of apparel that includes an electromagnetically shielding fabric, which shielding fabric comprises a substantially continuous system of conductive fibers combined with a non-conductive fabric and attenuates the emanated electromagnetic field at frequencies less than about 1 gigahertz; and
   instructing the user to wear, while handling the animal, at least one said article of apparel,
   wherein said attenuating of the user's emanated electromagnetic field at frequencies less than about 1 gigahertz decreases the likelihood of a reaction by the animal to the user's emotional response or emotional state; and
   wherein handling the animal comprises one or more of (i) holding or touching the animal, directly or using equipment, (ii) feeding the animal, (iii) herding or restraining the animal, (iv) riding the animal, (v) using the animal to pull or push a vehicle, object, or equipment, (vi) training the animal, (vii) using the animal in a performance, display, or demonstration, or (viii) conducting a veterinary examination on the animal.

10. The method of claim 9 wherein the conductive fibers are intermingled with non-conductive fibers that form the non-conducting fabric.

11. The method of claim 9 wherein the conductive fibers are applied to a surface of the non-conductive fabric.

12. The method of claim 9 wherein at least one said article of apparel comprises an article of clothing, footwear, headwear, or eyewear.

13. The method of claim 9 further comprising constructing at least one said article of apparel prior to providing it to the user.

14. The method of claim 9 wherein at least one said article of apparel includes an odor absorber, suppressant, attenuator, or blocker.

15. The method of claim 9 wherein the shielding fabric includes between about 2% and about 35% by weight of the conductive fibers.

16. The method of claim 9 wherein the conductive fibers comprises stainless steel fibers.

17. The method of claim 9 wherein the conductive fibers comprise copper, silver, conductive ceramic, conductive polymer, or conductive nanotubes.

18. The method of claim 1 wherein said attenuating of one's own emanated electromagnetic field at frequencies less than about 1 megahertz decreases the likelihood of a reaction by the animal to one's own emotional response or emotional state.

19. The method of claim 1 wherein said attenuating of one's own emanated electromagnetic field at frequencies less than about 1 kilohertz decreases the likelihood of a reaction by the animal to one's own emotional response or emotional state.

20. The method of claim 9 wherein said attenuating of the user's emanated electromagnetic field at frequencies less than about 1 megahertz decreases the likelihood of a reaction by the animal to the user's emotional response or emotional state.

21. The method of claim 9 wherein said attenuating of the user's emanated electromagnetic field at frequencies less than about 1 kilohertz decreases the likelihood of a reaction by the animal to the user's emotional response or emotional state.

22. A method comprising attenuating, while in the presence of a non-human animal that is aware of one's presence, one's own emanated electromagnetic field by wearing at least one article of apparel that includes an electromagnetically shielding fabric, which shielding fabric comprises a substantially continuous system of conductive fibers combined with a non-conductive fabric and attenuates the emanated electromagnetic field at frequencies less than about 1 gigahertz, wherein said attenuating of one's own emanated electromagnetic field at frequencies less than about 1 gigahertz decreases the likelihood of aggressive behavior by the animal in response to one's own emotional response or emotional state.

23. A method comprising attenuating, while a user is in the presence of a non-human animal that is aware of the user's presence, the user's emanated electromagnetic field by:
   providing to the user at least one article of apparel that includes an electromagnetically shielding fabric, which shielding fabric comprises a substantially continuous system of conductive fibers combined with a non-conductive fabric and attenuates the emanated electromagnetic field at frequencies less than about 1 gigahertz; and
   instructing the user to wear, while in the presence of the animal, at least one said article of apparel,
   wherein said attenuating of the user's emanated electromagnetic field at frequencies less than about 1 gigahertz decreases the likelihood of aggressive behavior by the animal in response to the user's emotional response or emotional state.

* * * * *